(12) United States Patent
Felks et al.

(10) Patent No.: US 11,647,314 B2
(45) Date of Patent: May 9, 2023

(54) METHODS, DEVICES, AND SYSTEMS FOR IMPACT DETECTION AND REPORTING FOR STRUCTURE ENVELOPES

(71) Applicants: Timothy E. Felks, Overland Park, KS (US); Joshua D. Heiner, Lehi, UT (US); Matthew C. Romney, Alpine, UT (US)

(72) Inventors: Timothy E. Felks, Overland Park, KS (US); Joshua D. Heiner, Lehi, UT (US); Matthew C. Romney, Alpine, UT (US)

(*) Notice: Subject to any disclaimer, the term of this patent is extended or adjusted under 35 U.S.C. 154(b) by 0 days.

(21) Appl. No.: 17/585,172

(22) Filed: Jan. 26, 2022

(65) Prior Publication Data
US 2022/0239995 A1  Jul. 28, 2022

Related U.S. Application Data

(60) Provisional application No. 63/141,756, filed on Jan. 26, 2021.

(51) Int. Cl.
*H04Q 9/00* (2006.01)
*G06Q 10/10* (2023.01)
(Continued)

(52) U.S. Cl.
CPC .......... *H04Q 9/00* (2013.01); *G06Q 10/1097* (2013.01); *G06Q 40/08* (2013.01); *H04Q 2209/82* (2013.01)

(58) Field of Classification Search
CPC .......... H04Q 2209/00; H04Q 2209/10; H04Q 2209/20; H04Q 2209/40; H04Q 2209/70;
(Continued)

(56) References Cited

U.S. PATENT DOCUMENTS 8,106,769 B1 * 1/2012 Maroney ................ G06Q 10/10
340/540
9,121,779 B2 * 9/2015 Martin .................... G01W 1/14
(Continued)

FOREIGN PATENT DOCUMENTS

JP          08159862 A  *  6/1996  ............ G01H 11/08

OTHER PUBLICATIONS

International Search Report and Written Opinion for International (PCT) Patent Application No. PCT/US22/13884, dated Apr. 26, 2022 14 pages.

*Primary Examiner* — Franklin D Balseca
(74) *Attorney, Agent, or Firm* — Sheridan Ross P.C.

(57) ABSTRACT

A sensor system for a structure comprises a sensor node in force transmitting contact with an impact receiving surface of a structure envelope of the structure. The sensor node is configured to generate first sensor data associated with the structure envelope of the structure and perform a first set of operations to filter out unwanted data from the first sensor data to form a first filtered dataset. The sensor system includes a sensor hub in communication with the sensor node. The sensor hub is configured to receive the first filtered dataset from the sensor node and perform a second set of operations on the first filtered dataset to identify an event experienced by the structure envelope that caused the sensor node to produce the first sensor data.

20 Claims, 10 Drawing Sheets

(51) Int. Cl.
*G06Q 40/08* (2012.01)
*G06Q 10/1093* (2023.01)

(58) Field of Classification Search
CPC ........... H04Q 2209/80; H04Q 2209/82; H04Q 2209/84; H04Q 9/00; G06Q 10/1093; G06Q 10/1097; G06Q 40/08
See application file for complete search history.

(56) References Cited

U.S. PATENT DOCUMENTS

| | | | |
|---|---|---|---|
| 9,727,921 B2* | 8/2017 | Cook | G06Q 40/08 |
| 10,198,771 B1* | 2/2019 | Madigan | G06Q 40/08 |
| 10,261,003 B2* | 4/2019 | Martin | G01W 1/14 |
| 10,405,070 B2* | 9/2019 | Schwarzkopf | H04Q 9/00 |
| 10,776,883 B2* | 9/2020 | Labrie | G06V 10/751 |
| 10,850,176 B2* | 12/2020 | Oguchi | A63B 24/0003 |
| 11,126,966 B2* | 9/2021 | Moren | G06Q 10/10 |
| 11,353,623 B2* | 6/2022 | Schiff | G01H 11/08 |
| 2016/0189531 A1 | 6/2016 | Modi et al. | |
| 2017/0186309 A1 | 6/2017 | Sager et al. | |
| 2018/0005125 A1 | 1/2018 | Fadell et al. | |
| 2018/0336418 A1* | 11/2018 | Splittstoesser | G06Q 50/16 |
| 2019/0162572 A1* | 5/2019 | Munigala | E03B 7/072 |
| 2020/0219378 A1 | 7/2020 | Farrand et al. | |

* cited by examiner

METHODS, DEVICES, AND SYSTEMS FOR IMPACT DETECTION AND REPORTING FOR STRUCTURE ENVELOPES

CROSS REFERENCE TO RELATED APPLICATIONS

This application claims the benefit of U.S. Provisional Application No. 63/141,756, filed on Jan. 26, 2021, which application is incorporated herein by reference in its entirety.

FIELD

The disclosure relates generally to impact detection and reporting for structure envelopes.

BACKGROUND

Insurance providers for real property, such as for residential and commercial buildings, often rely upon the insured to report property damage and/or incidents that may have caused property damage, which may lead to delays in reporting, inaccurate reporting, fraudulent reporting, and/or other problems that introduce inefficiencies to the insurance industry.

SUMMARY

In an illustrative embodiment, a sensor system for a structure comprises a sensor node in force transmitting contact with an impact receiving surface of a structure envelope of the structure. The sensor node is configured to generate first sensor data associated with the structure envelope of the structure and perform a first set of operations to filter out unwanted data from the first sensor data to form a first filtered dataset. The sensor system includes a sensor hub in communication with the sensor node. The sensor hub is configured to receive the first filtered dataset from the sensor node and perform a second set of operations on the first filtered dataset to identify an event experienced by the structure envelope that caused the sensor node to produce the first sensor data.

In another illustrative embodiment, an impact detection method for a structure comprises producing, by an impact sensor of a first node of a sensor system, first sensor data associated with a structure envelope of the structure. The impact sensor is in force-transmitting contact with an impact receiving surface of the structure envelope to detect impacts to the impact receiving surface. The method comprises performing, at the first node, a first set of operations to filter out unwanted data from the first sensor data to form a first filtered dataset, receiving, at a second node of the sensor system, the first filtered dataset from the first node, and performing, at the second node, a second set of operations on the first filtered dataset to identify an event experienced by the structure envelope that caused the sensor to produce the first sensor data.

In another illustrative embodiment, a sensor system comprises a first node in force transmitting contact with an impact receiving surface of a structure envelope of the structure. The first node is configured to generate first sensor data associated with the structure envelope of the structure and perform a first set of operations to filter out unwanted data from the first sensor data to form a first filtered dataset. The sensor system comprises a second node in communication with the first node. The second node is configured to receive the first filtered dataset from the first node, and perform a second set of operations on the first filtered dataset to identify an event experienced by the structure envelope that caused the first node to produce the first sensor data.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of inventive concepts will become apparent to those skilled in the art upon consideration of the embodiment descriptions provided hereinbelow.

BRIEF DESCRIPTION OF THE FIGURES

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
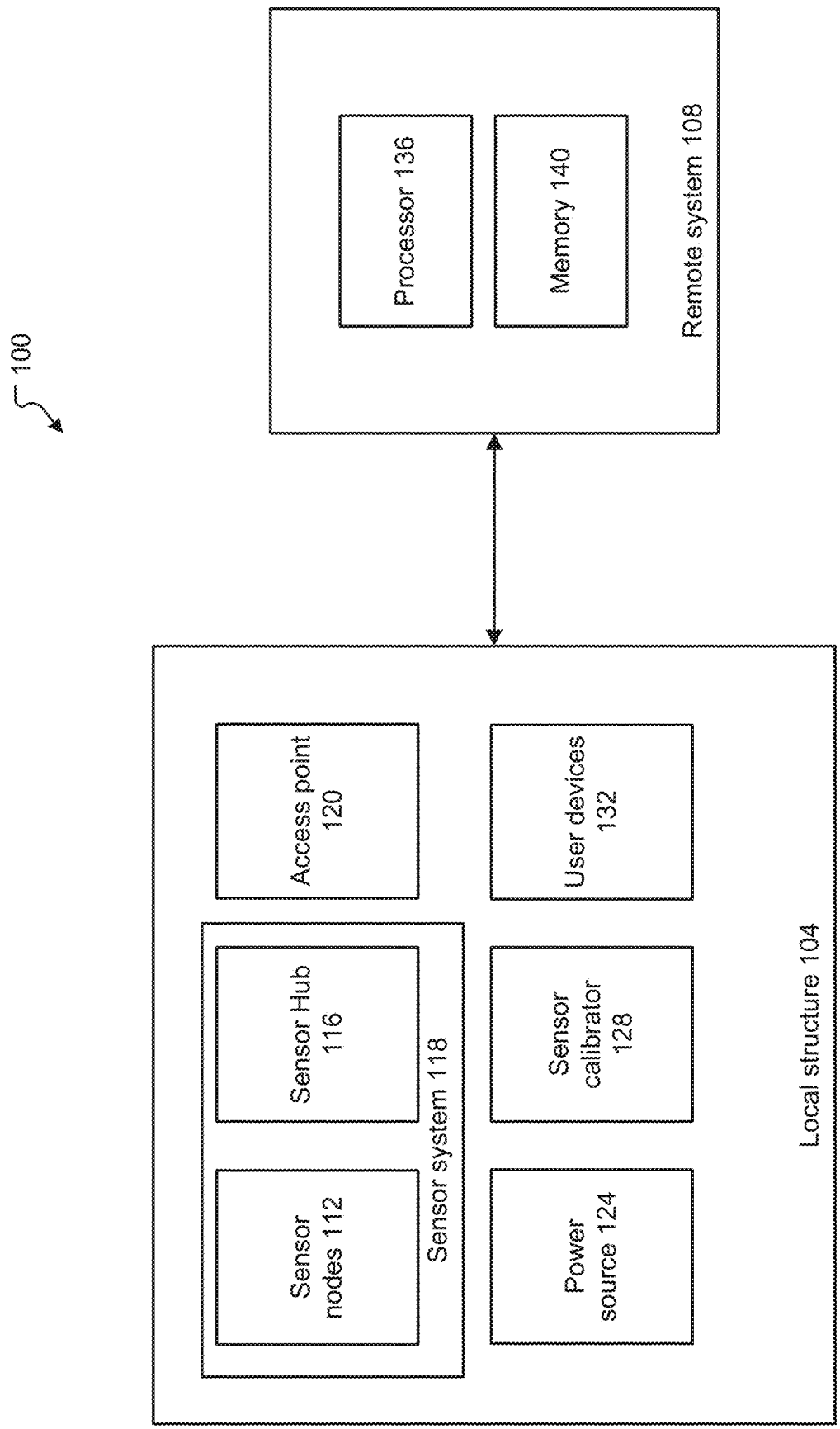
FIG. 1 illustrates a block diagram of a system according to at least one example embodiment.

The ensuing description provides example embodiments, and is not intended to limit the scope, applicability, or configuration of the claims. Rather, the ensuing description will provide those skilled in the art with an enabling description for implementing the described embodiments. Various changes may be made in the function and arrangement of elements without departing from the spirit and scope of the appended claims.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device.

It will be appreciated from the following description, and for reasons of computational efficiency, that the components of the system(s) herein can be arranged at any appropriate location within a distributed network of components without impacting the operation of the system(s).

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

As described in more detail below, inventive concepts are directed to methods, devices, and systems for impact detection and reporting for structure envelopes (also called building envelopes). Insurance carriers and commercial/residential real estate owners have interests in tracking the integrity of structures on their real estate. At least one example embodiment provides methods, devices, and/or systems that accurately capture, in real-time, impacts to structures caused by hail, falling objects (trees, powerlines, etc.), and/or the like. At least one example embodiment further comprises methods, devices, and/or systems to report the impacts to a local and/or remote entity.

Inventive concepts provide, among other things, a sensing system or sensor system that may be incorporated as part of a structure, for example, on a roof of the structure to detect impacts for damage assessment and reporting purposes. In one embodiment, the sensing system may include a sensor layer having a network of impact sensors that is provided between a deck layer and an underlayment layer of a roof. Additionally or alternatively, the sensor layer may be integrated with any other layer on the roof, for example, integrated with the underlayment layer and/or integrated with the shingles or other outermost covering.

The impact sensors may comprise any known type of electrical, mechanical, and/or electromechanical sensor that detects impact, vibration, or mechanical shock, for example, piezoelectric sensors, piezoresistive sensors, accelerometers, capacitive sensors, strain-gauge sensors, optical sensors, pressure sensors, force-sensitive resistors, etc.

The network of impact sensors may be distributed at desired intervals and/or in a desired pattern (e.g., in a matrix) throughout the sensor layer or in certain portions of the sensor layer according to design preferences. The network of impact sensors may include sub-sections of impact sensors that are independent from other sections of impact sensors to provide more localized impact detection and reporting for the structure. The network of impact sensors may convert detected impacts into electrical signals that are reported to and/or stored at a local and/or remote processing device (or processor) via any known wired and/or wireless communication method. The network of impact sensors may include more or fewer sensor areas of the structure depending on a level of sensitivity desired for the areas of the structure. For example, areas of the structure that are more vulnerable to impacts (e.g., areas under trees or other hazards) may include a higher density of impact sensors compared to areas of the structure that are less vulnerable to impacts.

As noted above, the network of impact sensors may include or be connected to a local processing device (e.g., a smart home system, a mobile phone, a sensor hub, etc.) that receives the electrical signals and analyzes the electrical signals (e.g., via a mobile phone app or other program) to determine characteristics associated with the detected impacts, which may then be reported to an interested entity such as property owner, an insurance carrier, other interested parties (real estate advertisers, prospective home buyers, shingle manufacturer, weather services, etc.), and/or the like. The interested entity may choose to further process the data (via a processing device) and/or draw conclusions regarding a level of damage, remaining life of shingles, insurance costs, etc. For example, the processing device may draw from historical data/profiles of impacts to other structures to determine a level of damage, remaining life of shingles and/or insurance costs. Additionally or alternatively, unanalyzed electrical signals may be passed from a local transmitting device at or near the network of impact sensors through a communication network to a remote processing device for further analysis. In one embodiment, the electrical signals may be analyzed by the local processing device and any results of the analysis may be sent to the remote processing device or other remote entity. The communication network may be wired and/or wireless, as desired, and use any known wired and/or wireless communication standards, methods, etc.

The processing device (remote and/or local) may assign metadata to each detected impact. The metadata may include the time/date of the detection and other statistics associated with the impact such as size, force, and/or any other property of the impact that interested entities may find useful.

In at least one example embodiment, the interested entities may be notified upon detection of impacts, for example, if the detected impacts are determined by the processing device to possibly cause damage to the structure. The notification may be audible and/or visual. For example, the notification may be in the form of an email, an SMS message, a mechanical flag (similar to a circuit breaker), a sound alarm, and/or the like.

In at least one example embodiment, the processing device creates an impact history profile, for example, in the form of a table that includes a log of detected impacts and associated metadata.

In at least one example embodiment, the processing device generates a heatmap of the detected impacts that includes different colors to indicate different levels of impact so that localized impacts are easily distinguished on the structure. The processing device may store the heatmap as part of the impact history profile. In at least one example embodiment, the heatmap may be created in response to one or more conditions, such as when a frequency of detected impacts occurs more than a threshold frequency and/or when the detected impacts are over a threshold level of impact.

The impact sensors may be designed so as to detect only impacts that are above a desired threshold amount of impact. Additionally or alternatively, the impact sensors may be designed so as to detect nearly all impacts, and then the processing device may filter out those impacts that are above a desired threshold amount of impact and/or that occur more a desired threshold frequency for further processing and/or reporting.

In operation, an impact sensor may convert an impact into an electrical signal having a signal characteristic (amplitude, frequency, phase, wavelength, etc.) that is based on the impact. For example, the impact sensor may convert the impact into an electrical signal having an amplitude that is larger for stronger impacts and smaller for weaker impacts. The processing device (remote and/or local) may determine whether the amplitude of the electrical signal is above a threshold amplitude. If so, the processing device may perform full processing on the electrical signal (e.g., assign metadata, add an entry to the impact history profile, add a data point to the heatmap, etc.). If not, the processing device may consider the detected impact as an insignificant event and cease processing operations for that particular received signal. Alternatively, the processing device may perform fewer processing operations on electrical signals having amplitudes that are below the threshold. For example, the processing device may create an entry in the impact history profile in a section designated for insignificant impacts and assign desired metadata so that there is a record of an impact occurring.

In at least one example embodiment, the processing device may perform full processing on the detected impacts in response to one or more conditions, for example, when the detected impacts across a desired surface are occur more than a desired threshold frequency, when the detected impact is more than a desired threshold level of impact, and/or the like.

In at least one example embodiment, the sensing system may include additional sensing features, such as temperature sensing, weight sensing to detect a change in the weight of a shingle or missing roofing material, etc. Such information may be included as part of the metadata discussed above or other information set that may prove useful for associating temperature and/or weight changes with impact detections.

The processing device may correspond to one or many computer processing devices. For instance, the processing device may be a processor, for example, a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor may be provided as a microprocessor, Central Processing Unit (CPU), or plurality of microprocessors that are configured to execute the instructions sets stored in a memory. Upon executing the instruction sets stored in memory, the processor enables various functions of the impact detection device/system.

The memory may include any type of computer memory device or collection of computer memory devices. The memory may be volatile or non-volatile in nature and, in some embodiments, may include a plurality of different memory devices. Non-limiting examples of memory include Random Access Memory (RAM), Read Only Memory (ROM), flash memory, Electronically-Erasable Programmable ROM (EEPROM), Dynamic RAM (DRAM), etc. The memory may be configured to store the instruction sets depicted in addition to temporarily storing data for the processor to execute various types of routines or functions.

Inventive concepts relate to sensor nodes located inside an attic on the underside of a roof so as to be protected from outdoor environment. The sensor nodes may be rigidly coupled to the roof structure through, for example a single, standard fastener for ease of installation and availability of parts. Empirical testing may show that the number of sensor nodes for a particular structure can be optimized with strategic attachment to structural members (e.g., beams or joists) which are themselves coupled to the roof underlayment sheets and which tend to aggregate and couple vibrational energy from large areas. In one embodiment, sensor nodes receive calibration and undergo functional checks, which may be performed in a single step with a calibration device. Such a calibration device may comprise a small, hand-held battery-powered vibrational exciter (e.g., voice coil or eccentric mass-motor) which would output energy with a sweep of known amplitude and spectral distribution.

The sensor nodes are distributed throughout a residence or commercial building and may be connected via wired cable (e.g., standard CAT5/6 Ethernet wire) which supplies both power and communication. Alternatively, the sensor nodes are battery operated with data sent over a wireless connection. In one embodiment, the sensor nodes measure vibration by sudden acceleration with an accelerometer. A variety of algorithms may be employed to accurately detect and classify hail events (e.g., a machine learning approach). Sensor fusion strategies may yield additional insight or quality of data. In addition to an accelerometer, each sensor node may include a temperature sensor, an air sensor, a humidity sensor, a gas sensor (CO, CO2, VOCs) or particulates (smoke, dust, ash), and/or a microphone (hail events will produce significant acoustic events). A sensor node may further include pyroelectric type sensor (e.g., infrared-based) for early warning fire detection and/or identification of abnormally hot and cold zones in an attic space. The sensor nodes may transfer data to a sensor hub. For a wired connection, transfer can happen on event or on a scheduled basis. For a wireless configuration, power savings are key for battery longevity, and so the sensor node may only transfer data after a qualified event, but may also output an infrequent "heartbeat" for sensor integrity assessment. The data is collected and stored by the sensor hub, which may initiate transfer of data to a central data server on a regular basis and/or upon identification of an event. In one embodiment, the central data server initiates transfer from the sensor hub. The sensor hub is connected to the LAN through Ethernet or a wireless connection or the sensor hub is connected through cellular connection directly to central data server. If Ethernet cabling is used for power and data, a specialized sensor hub may be avoided and replaced with a standard COTS PoE Ethernet switch.

Although example embodiments are shown and described with respect to impact detection on a roof of a building, it should be appreciated that inventive concepts may also be applied to other parts of the building (e.g., siding, patios, etc.) and/or other structures (e.g., vehicles, roads, bridges, floors, or any other type of structure where impact detection is useful for the property owner or property insurer).

In view of the above, it should be understood that example embodiments provide methods, devices, and systems for easy detection, analysis, and reporting of impacts to structures, which may lead to increased efficiencies for insurance carriers (fewer and/or more targeted inspections, insurance fraud identification), improved home history metrics for property owners and/or buyers, improved weather reporting/forecasting, and/or the like.

FIG. 1 illustrates a block diagram of a system 100 according to at least one example embodiment. The system 100 includes a local structure 104 coupled to a remote system 108 through one or more suitable wired and/or wireless connections. In one non-limiting example, the local structure 104 corresponds to or includes a residential or commercial structure and the remote system 108 corresponds to or includes a database that receives, stores, and/or processes data received from other elements of the system 100 and/or provides certain control functions for elements of the local structure 104. In one embodiment, the remote system 108 is associated with an insurance provider and includes a server, a collection of servers, and/or the like. The local structure 104 and the remote system 108 may be in communication with one another over the Internet or other suitable fabric.

The local structure 104 includes one or more sensor nodes 112, a sensor hub 116, an access point 120, a power source 124, a sensor calibrator 128, and one or more user devices 132.

As described in more detail below with reference to FIG. 2, a sensor node 112 may include one or more sensors that sense various aspects of the environment of the local structure 104. For the environment of example, a sensor node 112 includes hardware and/or software for sensing various conditions within or surrounding a structure to which the sensor node 112 is attached. In at least one embodiment, a sensor node 112 includes one or more sensors that detect impacts to the structure (e.g., hail), ambient temperature, humidity, and/or any other suitable parameter that may be useful for gathering information about the structure's condition or for gather other information for an interested entity. Multiple sensor nodes 112 may be distributed throughout a single local structure 104 to provide a network of sensor nodes 112. As discussed in more detail below, each sensor node 112 may comprise a sensor package that includes multiple sensors and, in some cases, one or more sensor nodes have processing capabilities.

The sensor hub 116 may include suitable hardware and/or software to function as a centralized controller for the sensor nodes 112. As such, the sensor hub 116 may be in direct wired and/or wireless communication with the sensor nodes 112, which may involve the access point 120 (e.g., a wireless router). The sensor hub 116 may enact one or more suitable protocols to synchronize or pair each sensor node 112 to the sensor hub 116, which enables the sensor hub 116 to send and receive signals to/from sensor nodes 112 as well as uniquely identify each sensor node 112 to communicate with a specific sensor node 112. In at least one embodiment, the sensor hub 116 may query sensor nodes 112 for status information about the working condition of sensors in the sensor nodes 112. The sensor hub 116 may include a user interface with one or more devices that enable user input and/or that provide user-readable output (e.g., a user interface with switches, buttons, touch displays, illuminated indicators, and/or the like).

In one embodiment, the sensor hub 116 is accessible by and its functionality controlled with a user device 132 (e.g., a mobile phone) over a suitable wired or wireless link using one or more applications running on the user device 132. In this way, the sensor hub 116 may act as a gateway that allows user devices 132 to access and control aspects of each sensor node 112. Together, the sensor nodes 112 and sensor hub 116 form a sensor system 118 that may be installed at the local structure 104 at the time of initial building or as an after-market product. Stated another way, the sensor system 118 may be a proprietary system for tracking the condition of the local structure 104 and reporting such condition to the remote system 108 (e.g., an insurance provider). Although only one sensor hub 116 is shown, more sensor hubs 116 may be included (e.g., for larger local structures 104). Alternatively, at least one example embodiment contemplates placing the functionality of the sensor hub 116 into the access point 120 and/or into one of the sensor nodes 112 to reduce the number of sensor hubs or to completely eliminate the sensor hub 116 from the system 100. In at least one embodiment, the sensor system 118 may further comprise the remote system 108, the sensor calibrator 128, the user devices 132, the access point 120, and/or the power source 124. For example, some or all components of system 100 may be bundled together and sold and operated as a bundle.

As may further be appreciated, one or more sensor nodes 112, the sensor hub 116, and/or the remote system 108 may comprise circuitry that facilitates communication with the sensor hub 116 and other sensor nodes 112. Such circuitry may include amplification circuitry to amplify outgoing signals and/or incoming signals as well as codec circuitry to code and decode outgoing and/or incoming signals to maintain a secure connection between elements of the system 100.

In accordance with "smart home" concepts, the sensor hub 116 may receive updates (e.g., firmware updates from a remote server associated with the sensor hub 116, like the remote system 108). The sensor hub 116 may then distribute corresponding updates to sensor nodes 112. The sensor hub 116 may receive additional information that can be correlated with output of the sensor nodes 112. For example, the sensor hub 116 may receive weather-related information (e.g., from the Internet) and correlate this information with output from the sensor nodes 112 as part of verifying the accuracy of the output from the sensor nodes 112, assessing the condition of the local structure 104, and/or determining whether to report anything to the remote system 108. For example, the output of the sensor nodes 112 may be verified or enhanced by consulting external information retrieved or received by the sensor hub 116. To further illustrate this point, consider a scenario where the output of one or more sensor nodes 112 taken alone indicates that the local structure 104 has experienced a hailstorm. In this case, external weather-related information received by the sensor hub 116 may be used to confirm or disconfirm that a hailstorm occurred. If the externally received weather-related information indicates that a hailstorm has likely occurred, then the sensor system 118 may take steps to report the event to the remote system 108. On the other hand, the sensor system 118 may hold reporting when the weather-related information indicates that a hailstorm has not likely occurred, meaning that the sensor nodes 112 may have detected an event other than a hailstorm (e.g., an event caused by loose debris impacting the local structure 104 on a windy day).

The access point 120 may include suitable hardware and/or software for enabling wired and/or wired communication between elements of the local structure 104 and between the local structure 104 and the remote system 108. Without limitation, an access point 120 may include a wireless router (e.g., Wi-Fi router), a modem that pairs with an internet provider, a switch (e.g., an Ethernet switch), and/or other suitable device for exchanging data and control signals within the local structure 104 and between the local structure 104 and the remote system 108. In one non-limiting embodiment, the access point 120 may provide wired communication between the local structure 104 and the remote system 108 over the Internet while also providing wireless communication between elements of the local structure 104 (e.g., the sensor nodes 112, the sensor hub 116, the sensor calibrator 128, and/or user devices 132).

The power source 124 may provide power to one or more of the elements in the local structure 104, such as the sensor hub 116, the sensor nodes 112, the access point 120, and/or the user devices 132. For example, the power source 124 includes one or more power outlets integrated with the local structure 104 (e.g., a 120V, 50 Hz-60 Hz outlet or other suitable power outlet). In at least one embodiment, the sensor nodes 112 and/or the sensor hub 116 receive power and communicate data over the same cable, for example, using power-over-Ethernet (PoE) Cat 5 or Cat 6 cables.

The sensor calibrator 128 may be a device including hardware and/or software that enables functional checks and calibration of the sensor nodes 112 and/or the sensor hub 116. For example, the sensor calibrator 128 may comprise a portable, battery powered device, that includes a vibrational exciter such as a voice coil or eccentric mass-motor (e.g., an eccentric rotating mass vibration motor) that outputs energy (e.g., vibrations) with a sweep of known amplitude and spectral distribution. Upon installation of the sensor nodes 112 on the local structure 104, an installer of the sensor system 118 may use the sensor calibrator 128 to calibrate or perform functional checks on the sensor nodes 112 and/or the sensor hub 116 by comparing the known characteristics of the vibrational exciter with vibration characteristics sensed by the sensor nodes 112. Calibration may include making appropriate adjustments to sensor sensitivities, sensor locations, sensor mounts, and/or the like based on the comparison. Additionally or alternatively, calibration or functional checks may trigger adjustments to coefficients applied in an adaptive filtering algorithm (e.g., performed at the sensor node 112 and/or at the sensor hub 116). If the sensor system 118 employs a machine learning algorithm or neural network approach, the calibration data may be used as training data to tailor or to optimize the sensor system 118 for complex mechanical nuances of the local structure 104.

The sensor calibrator 128 may remain on-site with the local structure 104 after installation of the sensor system 118 for future calibration or functional checks by an occupant of the local structure 104 or may be removed from the local structure 104 (e.g., as property of the installer of the sensor system 118). In at least one embodiment, the sensor calibrator 128 may be detachably connected to the sensor hub 116 in a manner that enables the sensor calibrator 128 to be stowed with sensor hub 116 as a single unit. Such connection may be purely mechanical (e.g., a snug fit or some type of lock-unlock connection) or electro-mechanical. In the event of an electro-mechanical connection, the sensor calibrator 128 may include a rechargeable power source that receives a hard-wired or wireless charge when connected to the sensor hub 116 so that the sensor calibrator 128 is ready for at-will use. Such an electro-mechanical connection may also enable the sensor calibrator 128 to exchange information with the sensor hub 116 related to previous or future calibration or functional checks. The sensor calibrator 128 may further receive firmware updates through an electromechanical connection to the sensor hub 116. In another embodiment, the sensor calibrator 128 may be built into and not removable from a sensor node 112.

In yet another embodiment, one or more sensor calibrators 128 are installed in the local structure 104 in the same or similar fashion as the sensor nodes 112 so that the system can periodically run functional checks with ease and efficiency. An installed sensor calibrator 128 may be in wired or wireless communication with the sensor nodes 112 and/or the sensor hub 116 to enable data and control signals to pass therebetween. The sensor calibrator 128 may include its own set of sensors (e.g., a vibration sensor) and provide calibration data to the sensor nodes 112 and/or the sensor hub 116 for comparison against sensor data sensed at the sensor nodes 112.

In a non-limiting example, the sensor system 118 and/or the sensor calibrator 128 may prompt a user or an occupant of the local structure 104 (through a user device 132 or other suitable audio/visual alert mechanism) to carry out periodic functional checks or calibrations to ensure the sensor nodes 112 and sensor hub 116 are functioning properly. Such prompts may be issued at regular intervals based on elapsed time since a previous calibration or functional check and/or issued at irregular intervals, for example, when the sensor hub 116 detects that a sensor node 112 may be malfunctioning and/or after detection of an event (e.g., a weather event) that may have interfered with the sensor system's 118 ability to accurately detect and report information.

A user device 132 may include or correspond to a computing device that enables a user to interact directly with the sensor system 118 or to interact indirectly with the sensor system 118 through, for example, the access point 120. Thus, a user device 132 may include a smartphone, a tablet, a laptop, a desktop, a smart speaker/display, and/or the like. As noted above, a user device 132 runs one or more applications (e.g., made available to the user by an application server of the remote system 108) that interface with the sensor system 118 so that a user can monitor and control the sensor system 118. Additionally, a user device 132 may run one or more applications or web browser instances to access the remote system 108 through the access point 120 and/or through a cellular network so that a user can view information about the local structure 104 as processed and stored by the remote system 108. Such access to the remote system 108 may be restricted (e.g., by requiring a username and password to be entered into an application or web browser on the user device 132).

Still with reference to FIG. 1, the remote system 108 may include a processing device such as a processor 136 and memory 140. In accordance with inventive concepts, the remote system 108 may process data generated by the sensor system 118 and received from the local structure 104 for the purpose of drawing certain conclusions about the state or condition of the local structure 104, scheduling repairs and inspections, estimating repair costs, notifying interested parties, and/or for other purposes not explicitly stated herein but generally understood to be useful to interested parties.

The processor 136 may include processing circuitry for carrying out computing tasks, for example, tasks associated with generally controlling the sensor system 118 and/or processing signals received from the sensor system 118. The memory 140 may correspond to any type of suitable memory device or collection of memory devices configured to store instructions and may be volatile or nonvolatile in nature. Examples of the memory 140 include Flash memory, Random Access Memory (RAM), Read Only Memory (ROM), solid state memory (e.g., SSDs), disk memory (e.g., HDDs), variants thereof, combinations thereof, or the like. In some embodiments, the memory 140 and processor 136 are integrated into a common device (e.g., a microprocessor may include integrated memory). The processor 136 may comprise software, hardware, or a combination thereof. For example, the processor 136 may execute instructions stored on memory 140 to carry out tasks of the remote system 108. Additionally or alternatively, the processor 136 may comprise hardware, such as an application specific integrated circuit (ASIC). Other non-limiting examples of processing circuitry for the processor 136 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry.

Although not explicitly shown, it should be appreciated that the elements in FIG. 1 include suitable interfaces for facilitating wired and/or wireless communication. Examples of suitable interfaces include, without limitation, a coaxial port, an Ethernet port, a Universal Serial Bus (USB) port, an antenna, a driver circuit, a modulator/demodulator, and/or the like.

In general, it should be appreciated that sensor data generated by a sensor node 112 may pass through multiple tiers of processing of varying complexity. The analysis in each subsequent tier may become more involved or complex. The first, lowest level, tier of processing may be carried out by a sensor node 112 for the sake of determining when to report sensor data to the sensor hub 116. Meanwhile a second, more involved level of processing, may occur at the sensor hub 116 to identify specific events based on the sensor data from multiple sensor nodes 112 and to report these events and associated data to the remote system 108. Finally, a third, most involved level of processing may occur at the remote system 108 where events and sensor data from multiple local structures 104 are processed to determine trends and draw conclusions about the events and/or the local structures 104 (e.g., conditions regarding a level of damage, remaining life of shingles, insurance repair costs, premium adjustments, etc.). The remote system 108 may use trends within the sensor data and events collected from multiple structures 104 to improve the capabilities of the system 100 (e.g., improve the accuracy of conclusions reached by the remote system 108).

In one embodiment, the remote system 108 implements one or more methods of feedback to confirm or disconfirm the existence of a particular event as detected by the sensor hub 116 and/or to confirm or disconfirm some other aspect associated with an event (e.g., that an inspection or repair is needed). One such feedback mechanism may take the form of requesting that an occupant of a local structure 104 verify the occurrence of a particular event as detected by the sensor hub 116 and/or verify a state or condition of the local structure 104. The request to the occupant may take a suitable form, such as post mail, an SMS message, an email, a notification in an application on a user device 132, and/or the like.

Another feedback mechanism may take the form of the remote system 108 correlating a detected event with external information. For example, a given detected event and corresponding sensor data may be timestamped at the sensor hub 116, which enables the remote system 108 to correlate external information with the given detected event as part of confirming or disconfirming the occurrence of the event. The external information may be used to add to the likelihood or unlikelihood that the given detected event has actually occurred. Such external information may include weather-related information from a publicly available source and/or information about other events and data reported from other local structures 104 around the same time. In this case, the remote system 108 may determine a forward and/or backward looking time window that encompasses the timestamp of the given detected event. The remote system 108 may additionally or alternatively determine a subset of local structures 104 whose detected events and associated data may be relevant to verifying the occurrence of the given detected event. The size of the time window and subset of local structures 104 may vary depending on the type of given detected event and/or the external information. For example, if the given detected event is a tornado, then the size of the time window and subset of local structures 104 may be determined based on external information that indicates how long the tornado lasted and where the tornado touched down so that the remote system's 108 analysis is focused on an area of interest where the tornado occurred.

In addition to using feedback mechanisms to verify the occurrence of a given detected event, the same or similar feedback mechanism may be used to improve the accuracy of identifying the given detected event, for example, at the sensor hub 116. In this case, the remote system 108 may comprise or be in communication with a neural network or machine learning entity that is trained with events and associated data from local structures 104, feedback on the events and associated data, and/or any suitable empirical evidence that may improve the ability of the system 100 to accurately identify and draw conclusions about events.

As noted above, the sensor nodes 112 may collect various information at the local structure 104 and report (e.g., through the sensor hub 116) the information to the remote system 108 that is associated with an interested entity such as a property owner, an insurance carrier, other interested parties (real estate advertisers, prospective home buyers, shingle manufacturer, weather services, etc.), and/or the like. The interested entity may choose to further process the data at the remote system 108 and/or draw conclusions about the local structure 104, such as conclusions regarding a level of damage to local structure 104, remaining roof-life of the local structure 104, repair costs, scheduling of inspections or repair, etc. For example, the remote system 108 may draw from historical data/profiles of events at other structures to determine a level of damage, remaining life of the roof, and/or insurance repair costs.

In one embodiment, the remote system 108 may conduct further processing for the purposes of end-of-life forecasting. In one specific example, an insurance company (or roofing company, or materials supplier) informs the property owner that a thirty-year roof should be replaced at year 15 based on the recorded intensity and number of hailstorms or the like. The end-of-life forecasting may be implemented with a "percentage of life remaining" meter that is dynamically updated based on sensor system inputs. A visualization of the meter may even be presented to the interested entities.

The sensor system 118 (e.g., the sensor nodes 112 and/or the sensor hub 116) may assign metadata to the sensor data. For each sensor node 112 and/or for each sensor within a sensor node 112, the metadata may include the time/date of detected events and other statistics associated with the sensor data that an interested entity may find useful.

In at least one example embodiment, an interested entity is notified upon the sensor system 118 detecting certain events, such as impacts to the local structure 104. For example, an interested entity may be notified of a detected event for the local structure 104 (e.g., a detected impact event to local structure 104) when the sensor system 118 and/or the remote system 108 determines that the event may have caused damage to the local structure 104. The notification may be audible and/or visual. For example, the notification may be in the form of an email, an SMS message, a mechanical flag (similar to a circuit breaker), a sound alarm, and/or the like. The notification may further comprise light indicators, such as a flashing or multi-colored LED on a part of the sensor system 118 readily visible to a user (e.g., on the sensor hub 116 which may be in an interior space of the local structure 104).

In at least one example embodiment, the sensor hub 116 and/or the remote system 108 creates and stores an event history profile for a particular local structure 104. The event history profile may take the form of a table that includes a log of detected events and associated metadata. In one embodiment, the sensor hub 116 and/or the remote system 108 generates a heatmap of certain detected events, such as detected impacts. In this case, the heatmap may include different colors to indicate different levels of impact so that localized impacts are easily distinguished on the local structure 104. The sensor hub 116 and/or the remote system 108 may store the heatmap as part of the event history profile. In at least one example embodiment, a heatmap may be created in response to one or more conditions, such as when a frequency of a detected event occurs more than a threshold frequency and/or when the scale or severity of a detected event exceeds a threshold severity.

Figure 2:
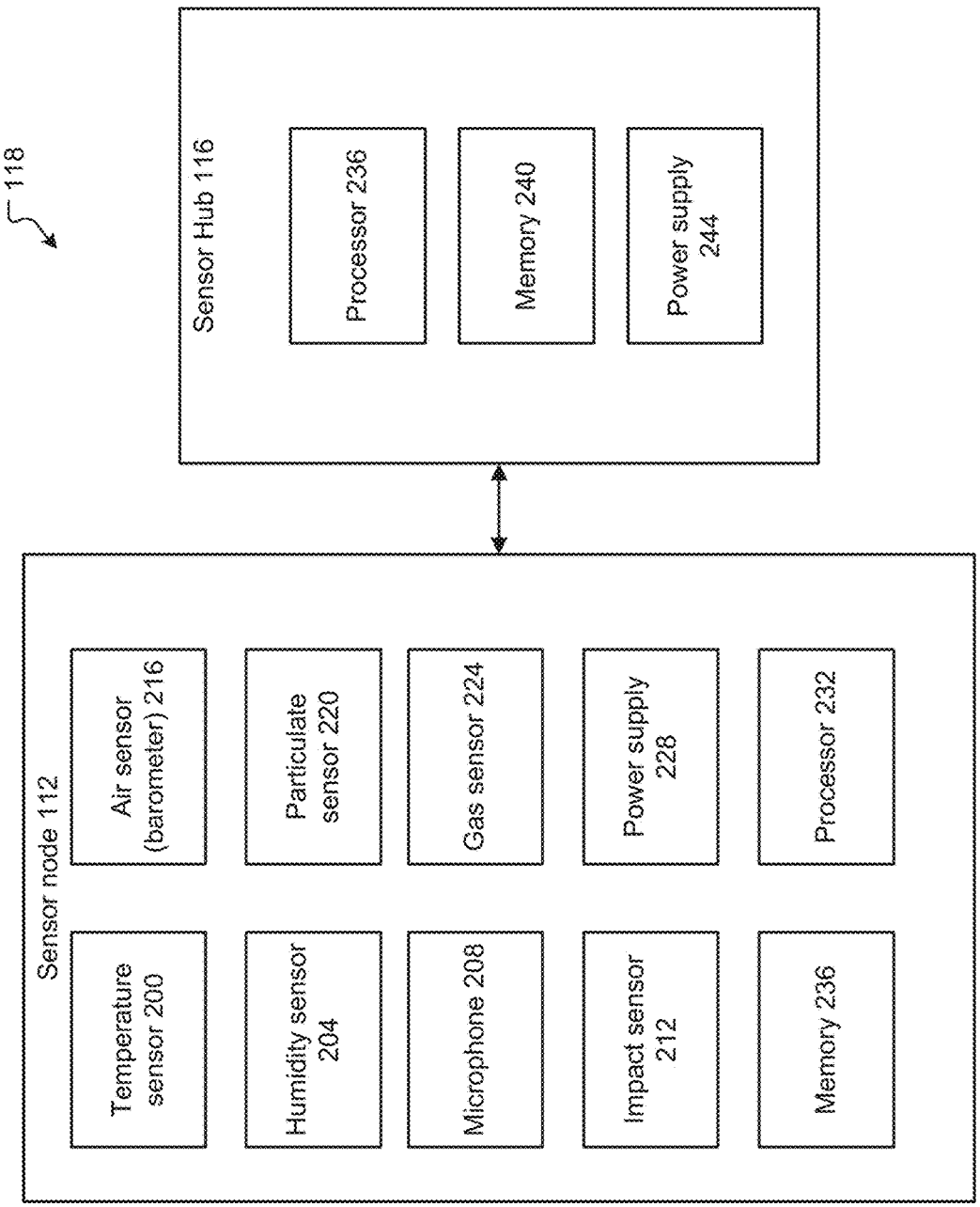
FIG. 2 illustrates block diagrams for a sensor node and a sensor hub according to at least one example embodiment.

FIG. 2 illustrates block diagrams for a sensor node 112 and a sensor hub 116 according to at least one example embodiment.

As shown in FIG. 2, a sensor node 112 includes a plurality of sensors 200 to 224, a power supply 228, a processor 232, and a memory 236. The plurality of sensors may include a temperature sensor 200, a humidity sensor 204, a microphone 208, an impact sensor 212, an air sensor 216, a particulate sensor 220, and a gas sensor 224.

The temperature sensor 200 may include any suitable sensor for sensing temperature (e.g., ambient air temperature). Non-limiting examples of a temperature sensor 200 include a thermocouple, a resistance temperature detector, a thermistor, a semiconductor-based IC temperature sensor, and/or the like.

The humidity sensor 204 may include any suitable sensor for sensing humidity (e.g., relative humidity, absolute humidity, etc.). Non-limiting examples of a humidity sensor 204 include a capacitive humidity sensor, a resistive humidity sensor, a thermal conductivity humidity sensor, and/or the like.

The microphone 208 may include any suitable sensor for sensing sound (e.g., caused by impacts to the local structure 104), for example, by converting sound into electrical signals. The microphone 208 may include one more acoustic sensors. Non-limiting examples of a microphone 208 include a resistive microphone, a dynamic microphone, a condenser microphone, a ribbon microphone, and/or the like. The microphone 208 may detect or measure potentially annoying and/or energy-wasting effects from wind. For example, one or more microphones 208 of one or more sensor nodes 112 may be used to pinpoint sources of wind whistles caused by gaps in insulation or seals in the local structure 104. The microphone 208 may also detect sounds for alerting interested parties to things like vibrating guy-wires, loose roof-mounted antennas, banging shutters, other loose exterior or interior fixtures, and/or the like. In one embodiment, the sensor system 118 flags segments of sound recording for further analysis by computers or humans.

The impact sensor 212 may include any suitable sensor for sensing impacts to the local structure 104. An impact sensor 212 may comprise any known type of electrical, mechanical, and/or electromechanical sensor that detects impact, vibration, or mechanical shock. Non-limiting examples of an impact sensor 212 include a piezoelectric sensor, a piezoresistive sensor, an accelerometer, a capacitive sensor, a strain-gauge sensor, an optical sensor, a pressure sensor, a force-sensitive resistor, and/or the like. The impact sensor 212 may be used to sense weight and/or the sensor node 112 may include a separate weight sensor.

The air sensor 216 may include any suitable sensor for detecting atmospheric pressure. As such, the air sensor 216 may take the form of a barometer. Non-limiting examples of the air sensor 216 include a mercury-based barometer, an aneroid barometer, a micro-electromechanical system (MEMS) based barometer, and/or the like.

The particulate sensor 220 may include any suitable sensor for detecting particles in ambient air, such as smoke, dust, ash, and/or the like. Non-limiting examples of a particulate sensor 220 include sensors that employ light blocking, light scattering, the Coulter principle, and/or the like to determine air quality.

The gas sensor 224 may include any suitable sensor for detecting one or more gases, such as radon, carbon dioxide, carbon monoxide, volatile organic compounds (VOCs), and/or the like. Non-limiting examples of a gas sensor 224 include, a metal oxide-based gas sensor, an optical gas sensor, an electrochemical gas sensor, a capacitance-based gas sensor, a calorimetric gas sensor, and/or the like.

Although sensors 200 to 224 are shown and described as being part of a sensor node 112, one or more sensors 200 to 224 may be integrated with other parts of the system 100, such as the sensor hub 116. In one embodiment, parameters sensed by certain ones of the sensors 200 to 224 may be additionally or alternatively be retrieved from an external source. For example, weather related-information such as temperature, humidity, air pressure, and/or particulate levels do not need to be directly sensed at the location structure 104. Instead, such information may be retrieved from a source external to the local structure 104 that provides weather-related information. In this case, the sensor hub 116 may retrieve weather-related information from the remote system 108 or from publicly accessible sites on the Internet (e.g., from the National Weather Service) that track weather for the region in which the local structure 104 resides and associate this information with parameters sensed by other sensors of the sensor nodes 112. In another scenario, a sensor node 112 and/or a sensor hub 116 may receive weather-related information such as temperature, humidity, air pressure, and/or particulate levels from a source that is external to the sensor node 112 and the sensor hub 116 but local to the local structure 104. Here, the source of the more localized weather-related information may be a weather beacon or sensors on site at the local structure 104 that are capable of sensing weather-related information and passing the sensed information to the sensor nodes 112 and/or the sensor hub 116 over a wired and/or wireless connection (e.g., a Wi-Fi connection).

It should be appreciated that more or fewer sensors may be included in a sensor node 112 and that each sensor node 112 may comprise the same set of sensors or different sets of sensors. For example, one sensor node 112 in a grouping of sensor nodes 112 for a particular structure 104 may be the "master" sensor node that senses certain parameters that are likely to be the same or similar across multiple sensor nodes 112. A single, master, sensor node 112 may sense temperature, humidity, air pressure, particulates, and/or any other parameters that are likely to be the same or close to the same for all sensor nodes 112. In addition, sensors other than those shown and described in FIG. 2 may be included in a sensor node 112. Sensor data processing by the master sensor node may also be used to trigger collection of sensor data by one or more other, subordinate, sensor nodes. For example, one master sensor node may be in an "always on" or "monitoring" state while other nodes in the system are in an off-state, or a low-power, sleep state. The master sensor node may "wakeup" the subordinate sensor nodes upon collecting sensor data that could be indicative of an event that would warrant collection of sensor data by the subordinate sensor nodes. The processor 232 of the master sensor node may wakeup other sensor nodes wirelessly and/or through a wired connection.

In another embodiment, a sensor node 112 may include circuitry coupled to the processor 232 that maintains the processor 232 in a low power state or an off state until output of a sensor in the sensor node 112 triggers the processor 232 to wake up and start processing the output from the sensor and/or other sensors of the sensor node 112. Such circuitry may be electromechanical in nature and/or may use energy derived from the sensed parameter to trigger the wakeup process. For example, mechanical and/or electrical energy generated by impacts detected by the impact sensor 212 may be harvested and used to toggle a mechanical or electrical switch that couples and decouples the processor 232 to the power supply 228.

The power supply 228 may comprise suitable hardware and/or software for supplying power to elements of the sensor node 112, for example, to the processor 232 and/or one or more of the sensors if such sensors require power. In one embodiment, the power supply 228 may comprise an appropriate converter (e.g., a buck converter, an AC-DC converter) and/or a regulator (e.g., a voltage regulator) for converting a power signal received over a hardwired line from power source 124 of the local structure 104 into a power signal suitable for the device being powered. In another embodiment, the power supply 228 may comprise one or more batteries (rechargeable or non-rechargeable) as a main power source or as a backup power source for the sensor node 112 for when the power source 124 is inoperable or unavailable. In yet another embodiment, the power supply 228 may be at least partially external to the sensor node 112 and capable of generating "green" power. For example, the power supply 228 may comprise solar panels, wind-harnessing structures, and/or other suitable renewable energy harvesters that provide power for one or more of the sensor nodes 112 on the structure 104.

The processor 232 may comprise the same or similar structure as the processor 136 in FIG. 1 while the memory 236 may comprise the same or similar structure as the memory 140 in FIG. 1. In general, the processor 232 controls sensors of the sensor node 112 and controls communication between the sensor node 112 and external elements, such as the sensor hub 116, other sensor nodes 112, and/or the remote system 108.

The memory 236 may store sensor data from sensors of the sensor node 112 while the processor 232 may perform some low-level pre-processing of the sensor data prior to sending to the sensor hub 116 and/or the remote system 108. For example, the processor 232 may pre-process sensor data as part of determining whether to report the sensor data to the sensor hub 116 and/or the remote system 108. The processor 232 may withhold reporting sensor data unless one or more thresholds are met or exceeded, which may avoid unnecessary reporting and reduce power consumption.

In some embodiments, the one or more thresholds are associated with the sensor data so that the processor 232 reports only potentially useful sensor data back to the sensor hub 116 and/or the remote system 108. For example, if sensor data from one or more sensors (e.g., microphone 208 and impact sensor 212) exceed respective thresholds that are associated with the presence of a storm (e.g., hailstorm), then the processor 232 may report all or selected sensor data back to the sensor hub 116 and/or the remote system 108.

Additionally or alternatively, the one or more thresholds are associated with a parameter or parameters other than the sensor data. For example, the one or more thresholds may correspond to an elapsed amount of time since the last report from a sensor node 112 so that the sensor node 112 reports sensor data at specified intervals. Upon successful completion of reporting sensor data to the sensor hub 116 and/or the remote system 108, the processor 232 may erase the reported sensor data from memory 236. The one or more thresholds may be design parameters set based on empirical evidence and/or preference. The one or more thresholds may be preprogrammed into the processor 232 prior to installation and/or provided by the sensor hub 116 and/or the remote system 108. In at least one embodiment, the one or more thresholds are updated, for example, under control of the remote system 108 to improve filtering of the sensor data from a sensor node 112.

Still with reference to FIG. 2, the sensor hub 116 may include a processor 236, memory 240, and a power supply 244. The processor 236, the memory 240, and the power supply 244 may comprise the same or similar structure as the processor 136, memory 140, and power supply 244, respectively. As noted above, the sensor hub 116 may carry out a second tier of processing functions for the sensor data received from multiple sensor nodes 112, where such sensor data has undergone filtering process at the sensor nodes 112.

In more detail, the processor 236 may be capable of identifying events based on the sensor data received from sensor nodes 112. For example, the processor 236 may compare the sensor data received from one or more sensors of a sensor node 112 to reference data, and identify an event based on the comparison. The reference data may be pre-programmed into the sensor hub 116 prior to installation and/or provided by the remote system 108. In general, the processor 236 consults the reference data to distinguish between events, identify events, and then report or not report the events based on these determinations. Stated another way, the processor 236 is capable of identifying events based on the sensor data and the reference data. The identified events may then be reported or not reported to the remote system 108 based on factors such as the severity of the identified event.

By way of example, some impacts sensed by the impact sensor 212 may be associated with events not worth reporting to the sensor hub 116 and/or the remote system 108. For example, a person walking on a roof of the local structure 104 may be detected by the impact sensor 212 and reported to the sensor hub 116 after passing the first tier of processing at a sensor node 112. However, in some cases, this type of event (walking on the roof) does not warrant further analysis of sensor data at the remote system 108. On the other hand, some impacts sensed by the impact sensor 212 are associated with events that are worth reporting. For example, hail impacts may be detected by the impact sensor 212 and reported to the sensor hub 116 after passing the first tier of processing at a sensor node 112. Typically, a hailstorm event is worth reporting to the remote system 108. In this case, the processor 232 consults the reference data to determine whether detected impacts from impact sensor 212 are likely associated with a person walking on the roof or with a hailstorm, and then reports or does not report the event accordingly.

In general, the reference data may include historical data for the local structure 104 or historical data for multiple local structures 104. Such historical data associates particular events with sensor data from sensors of sensor nodes 112. By way of explanation and with reference to the above-discussed impact example, the reference data reference values, ranges of reference values, and/or rules known or suspected to exist for a given event (e.g., hailstorm, fallen tree or limb, windstorm, flooding, and/or the like). Table 1 illustrates an example set of reference data for Events 1 to N.

TABLE 1

| Reference data | | |
|---|---|---|
| Hailstorm event (Event 1) | Walking on roof event (Event 2) . . . | . . . Event N |
| Reference value or range for data from sensors of sensor type 1 | Reference value or range for data from sensors of sensor type 1 | Reference value or range for data from sensors of sensor type 1 |
| Reference value or range for data from sensors of sensor type 2 | Reference value or range for data from sensors of sensor type 2 | Reference value or range for data from sensors of sensor type 2 |
| Reference value or range for data from sensors of sensor type 3 | Reference value or range for data from sensors of sensor type 3 | Reference value or range for data from sensors of sensor type 3 |
| Reference value or range for data from sensors of sensor type 4 . . . | Reference value or range for data from sensors of sensor type 4 . . . | Reference value or range for data from sensors of sensor type 4 . . . |
| . . . Reference value or range for data from sensors of sensor type N | . . . Reference value or range for data from sensors of sensor type N | . . . Reference value or range for data from sensors of sensor type N |
| Rule sets 1 to N | Rule sets 1 to N | Rule sets 1 to N |

As shown in Table 1, a particular event may be correlated with references values or ranges of references values for particular sensor types within sensor nodes 112. For example, the reference data may take the form of a table that labels events 1 to N with names that are indicative of the detected event (e.g., hailstorm, walking on roof, tornado, flooding, other). Sensor types 1 to N refer to the types of sensors in the sensor nodes 112, and the reference values or ranges of reference values in Table 1 may be compared to the sensor data received from the sensor nodes 112. For example, the reference value or range of reference values for sensor type 1 may be temperature values for comparison against sensor data from temperature sensor 200, the reference value or range of reference values for sensor type 2 may be humidity values for comparison against sensor data from humidity sensor 204, and so on for each sensor type in the sensor nodes 112.

Sensor data from each sensor of a sensor node 112 is indicative of a value of a sensed parameter (temperature, humidity, etc.). The value of each sensed parameter may be compared a single reference value in the reference data and/or to a range of reference values in the reference data for the purpose of identifying an event. An event is identified when the value of each sensed parameter meets certain criteria associated with the single reference value and/or the range of reference values for that particular event (e.g., the values of all sensed parameters during a time period fall within respective reference ranges for the parameters associated with a particular event in the reference data, then identify the particular event). The reference values and ranges and types of sensed parameters being analyzed may vary depending on the event.

Table 1 further illustrates Rule sets 1 to N for each type of event 1 to N. In at least one embodiment, the rule sets define respective rules that must be met for a particular type of event to be identified. In one example, the rules take the form of logic statements that must assessed before a particular event is identified. The logic statements may be considered alone or in combination with the reference values or ranges of reference values to identify an event. Stated another way, a rule set by itself may be used to identify an event, or a rule set and the reference values may be used to identify an event. An example rule set may adhere to the following logic: "if number of impacts detected by sensor nodes 112 exceeds the number X within time period Y AND sensor data from microphones 208 is consistent with the sound of hail during time period Y, then detect a hailstorm event." Other rule sets may be implemented within the same event and the rule sets may vary depending upon the type of event being identified. Upon detecting or identifying an event, the sensor hub 116 may send the identified event and selected data associated with the identified event to the remote system 108 for further processing. If a set of sensor data does not fall into one of the categories of events in the reference data, the sensor hub 116 may associate the sensor data with an "other" event, which may be reported to the remote system 108 (e.g., for possible identification of an event) and/or stored at the sensor hub 116 in case another set of sensor data produces a similar result. Alternatively, if an event is not identified for a particular set of sensor data, then the sensor hub 116 may erase that sensor data from memory and take no further action in terms of reporting to the remote system 108. In one example, the sensor hub 116 may provide feedback to the sensor nodes 112 to adjust how the sensor nodes are reporting sensor data (e.g., adjust the thresholds for sensors of the sensor nodes 112 so that irrelevant sensor data does not pass the first filtering level at the sensor nodes 112, thereby reducing the use of processing and power resources of the sensor hub 116).

Figure 3:
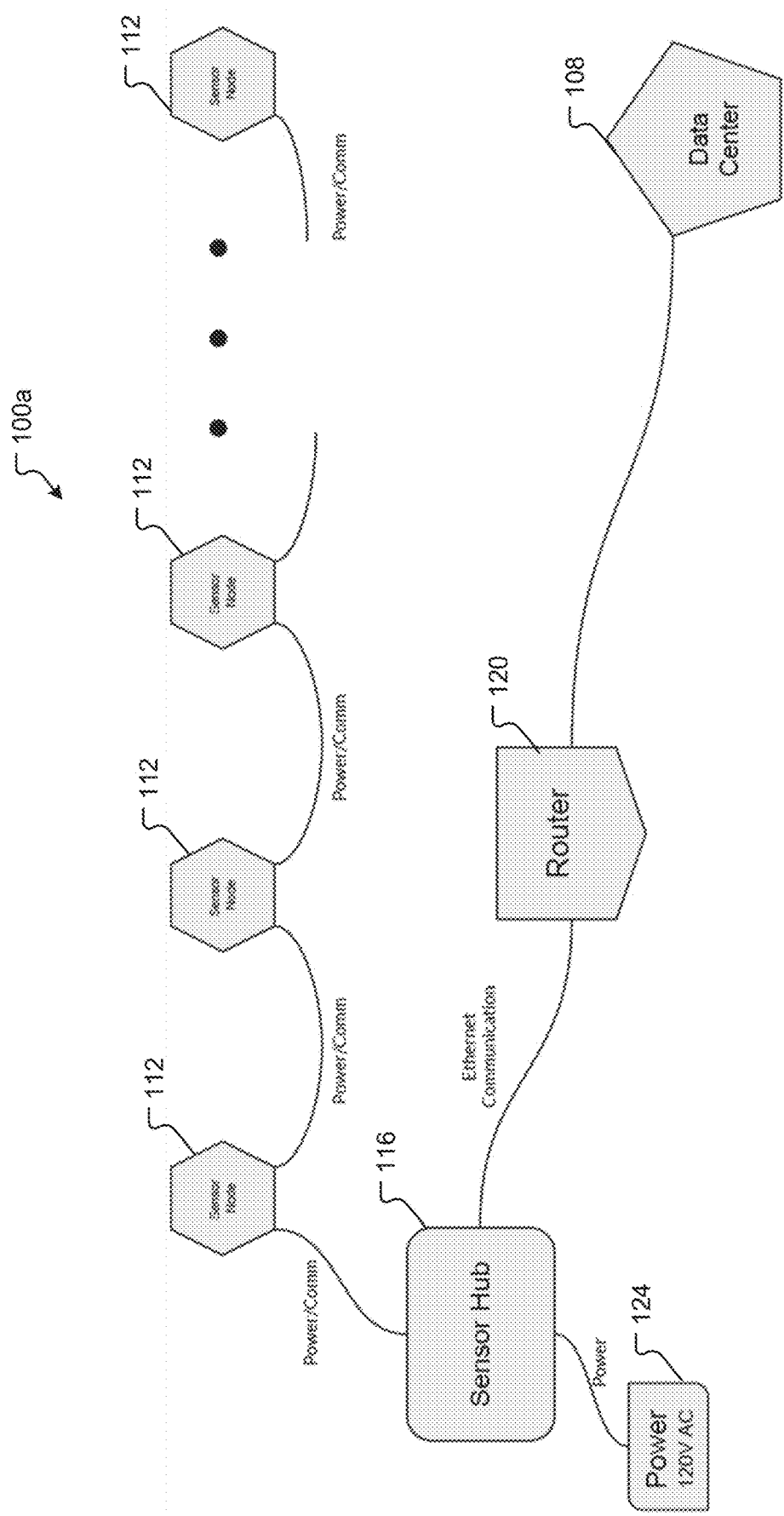
FIG. 3 illustrates an example implementation of certain elements in the system in FIG. 1 according to at least one example embodiment.

FIG. 3 illustrates an example implementation of certain elements in the system in FIG. 1, referred to in FIG. 3 as system 100a. The system 100a comprises sensor nodes 112, sensor hub 116, power source 124, a router or access point 120, and a data center or remote system 108. As may be appreciated, the system 100a relates to a fully wired system where the sensor hub 116 provides power and data communication to a single sensor node 112 over a wired connection (e.g., with power over Ethernet using CAT 5 or CAT 6 cables). The single sensor node 112 is then linked with other sensor nodes 112 with the same or similar wired connection. Similarly, the sensor hub 116 is in communication with the router 120 and data center 108 over a wired connection, such as an Ethernet connection or other suitable connection. In the configuration of FIG. 3, each sensor node 112 may be addressable by the sensor hub 116 through a mapping of addresses to sensor nodes 112 stored at the sensor hub 116. In other words, the sensor hub 116 has the capability to communicate with an individual sensor node 112 in the chain of sensor nodes 112 via a suitable addressing technique. Each sensor node 112, then, may comprise circuitry to determine whether a received signal is intended for that particular sensor node by checking whether an address or identifier in the received signal matches an address or identifier of that sensor node 112. If so, then the received signal is processed by that sensor node 112, and if not, then the received signal is passed to the next sensor node 112 in the chain until the correct sensor node 112 is reached.

Although the system 100a illustrates that only one sensor node 112 is directly connected to sensor hub 116, more than one sensor node 112 may be directly connected to sensor hub 116.

Figure 4:
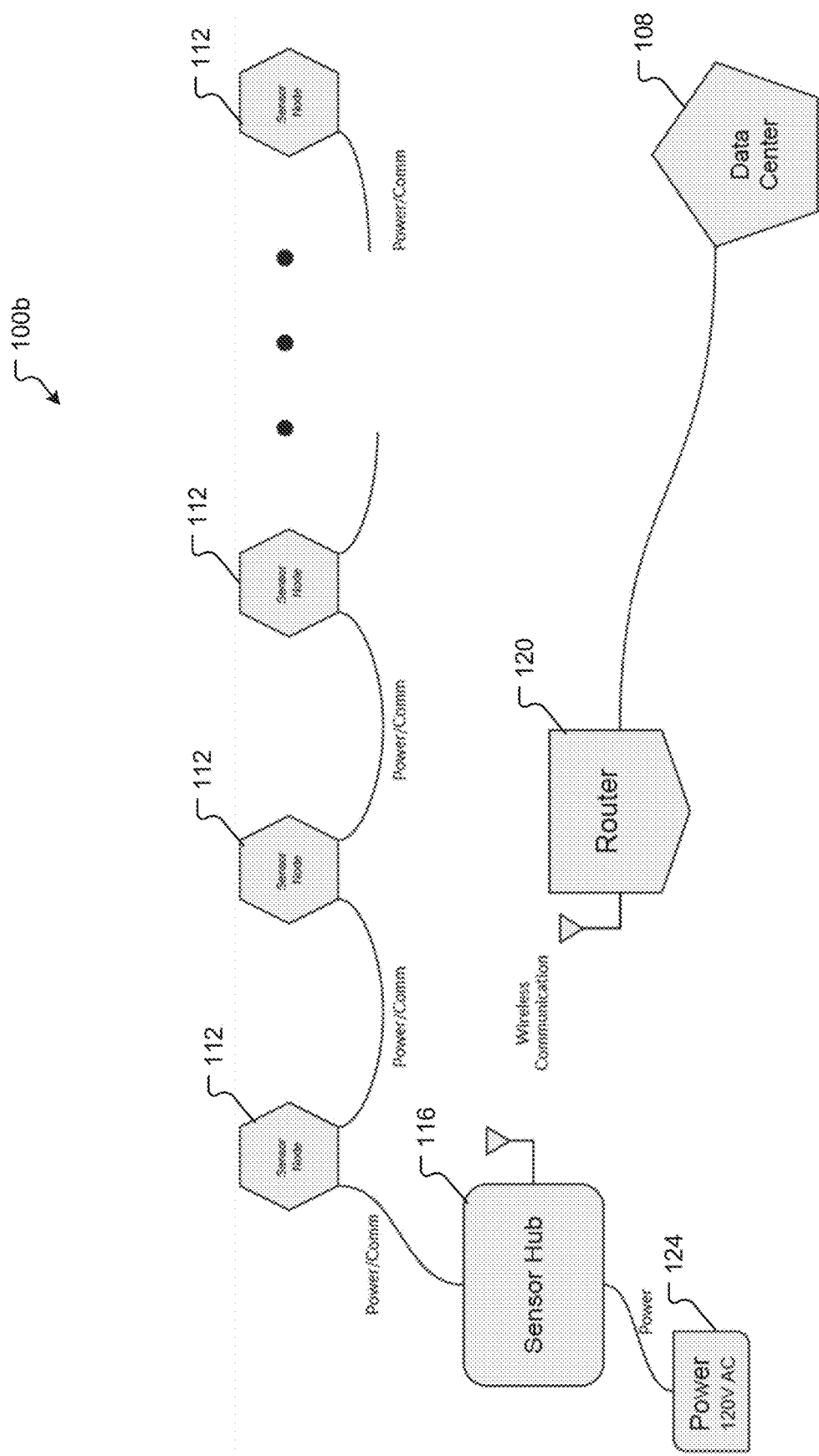
FIG. 4 illustrates another example implementation of certain elements in the system in FIG. 1 according to at least one example embodiment.

FIG. 4 illustrates an example implementation of certain elements in the system in FIG. 1, referred to in FIG. 4 as system 100b. The system 100b comprises sensor nodes 112, sensor hub 116, power source 124, a router or access point 120, and a data center or remote system 108. System 100b is substantially the same as system 100a except that the sensor hub 116 and the router 120 communicate wirelessly, for example, over a suitable wireless connection such as a Wi-Fi connection, near-field communication (NFC) connection, Bluetooth connection, and/or the like.

Figure 5:
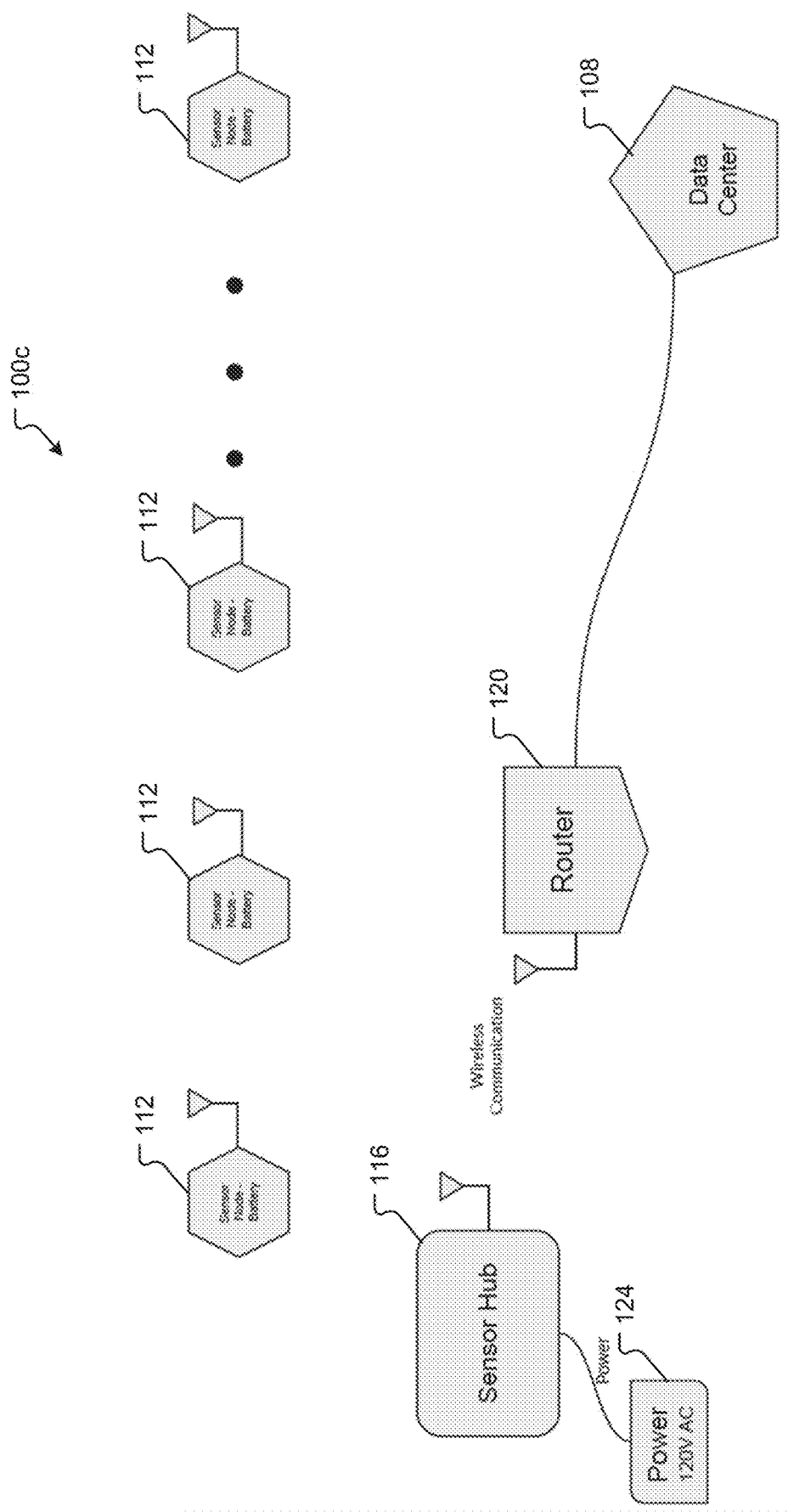
FIG. 5 illustrates yet another example implementation of certain elements in the system in FIG. 1 according to at least one example embodiment.

FIG. 5 illustrates an example implementation of certain elements in the system in FIG. 1, referred to in FIG. 5 as system 100c. The system 100c comprises sensor nodes 112, sensor hub 116, power source 124, a router or access point 120, and a data center or remote system 108. System 100c is substantially the same as system 100a except that the sensor nodes 112 are battery powered and communicate wirelessly with one another and/or with the sensor hub 116. As in FIG. 4, the sensor hub 116 and the router 120 also communicate wirelessly. Suitable wireless connections between sensor nodes 112, sensor hub 116, and router 120 include a Wi-Fi connection, near-field communication (NFC) connection, Bluetooth connection, and/or the like.

Figure 6:
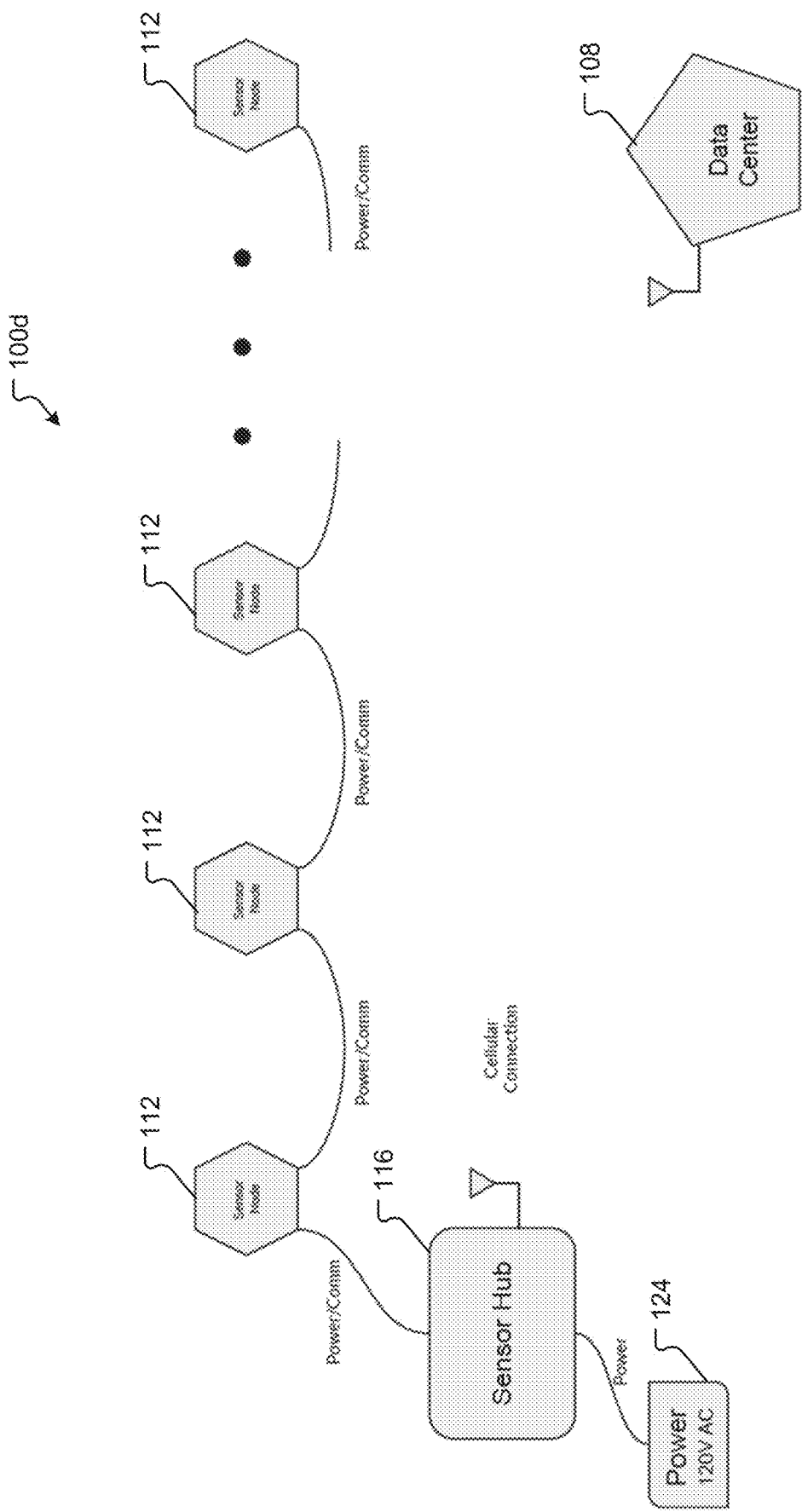
FIG. 6 illustrates an additional example implementation of certain elements in the system in FIG. 1 according to at least one example embodiment.

FIG. 6 illustrates an example implementation of certain elements in the system in FIG. 1, referred to in FIG. 6 as system 100d. The system 100d comprises sensor nodes 112, sensor hub 116, power source 124, and a data center or remote system 108. System 100d is substantially the same as system 100a except that the sensor hub 116 and the data center 108 communicate wirelessly, for example, over a suitable cellular wireless connection such as a 3G cellular connection, an LTE (4G) cellular connection, a 5G cellular connection, and/or the like. The cellular communication between the sensor hub 116 and data center 108 obviates the need for a separate router or access point 120, although it should be appreciated that multiple cellular towers may be in the transmission path between sensor hub 116 and data center 108.

Although the systems 100a to 100d have been described separately, it should be appreciated that the configurations shown therein may be combined with one another in any suitable fashion. For example, the sensor nodes 112 may comprise a combination of nodes that communicate wirelessly and nodes that communicate over a wired connection. Such an implementation may be useful where additional sensor nodes 112 with wireless capabilities are added to an existing system that includes wired sensor nodes 112 to form an ad-hoc network of sensor nodes 112 using wired and wireless communication.

Figure 7:
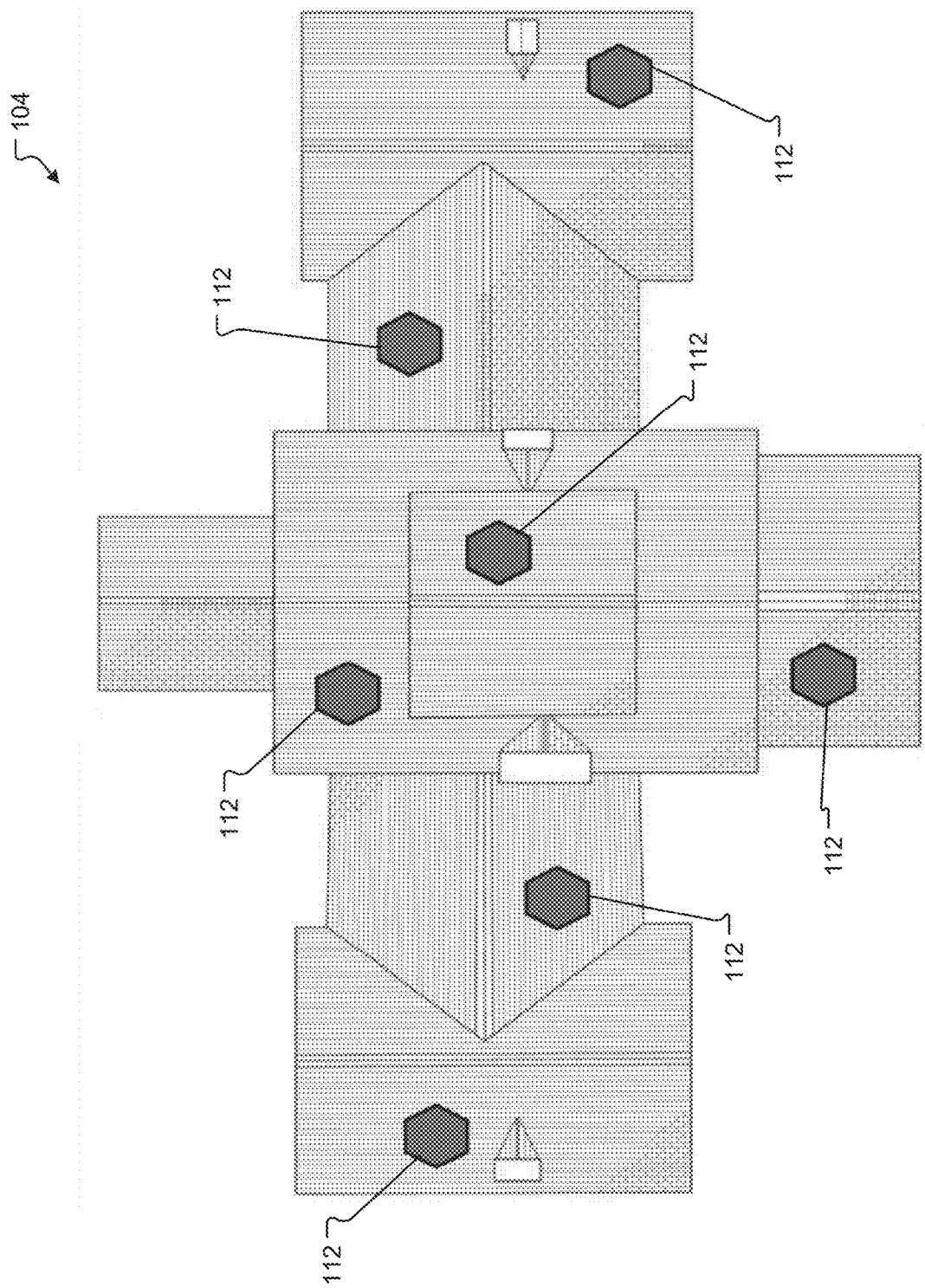
FIG. 7 illustrates an example of a local structure according to at least one example embodiment.

FIG. 7 illustrates an example of a local structure 104 according to at least one example embodiment. More specifically, FIG. 7 is a top view of a structure envelope (i.e., the roof) of a local structure 104. As shown, seven sensor nodes 112 (in any suitable configuration or combination thereof from FIGS. 3-6) are distributed throughout the structure 104. In this example, the local structure 104 has one sensor node per separately formed roof structure (the roof structure at the top of the figure without a sensor node 112 may be an entryway or other structure that is not of interest for monitoring). The sensor nodes 112 may be fixed to the local structure 104 in accordance with the discussion of FIG. 8 below, where a sensor package having the components of a sensor node 112 is mounted to beams, joists, or deck layer (e.g., plywood that laid over beams of a roof) of the local structure 104. These components are considered useful because these areas tend to aggregate and couple vibrational energy from large areas. However, example embodiments are not limited thereto, and a number and location of sensor nodes 112 may vary according to the size and/or shape of the local structure 104. In at least one embodiment, a type of calibration process may be performed at or prior to installation of the sensor nodes 112 to determine the number and/or locations of sensor nodes 112. Here, the calibration device 128 may be useful for simulating impacts in manner that enables an installer of the system to gather information on where a sensor node 112 should be located.

Figure 8:
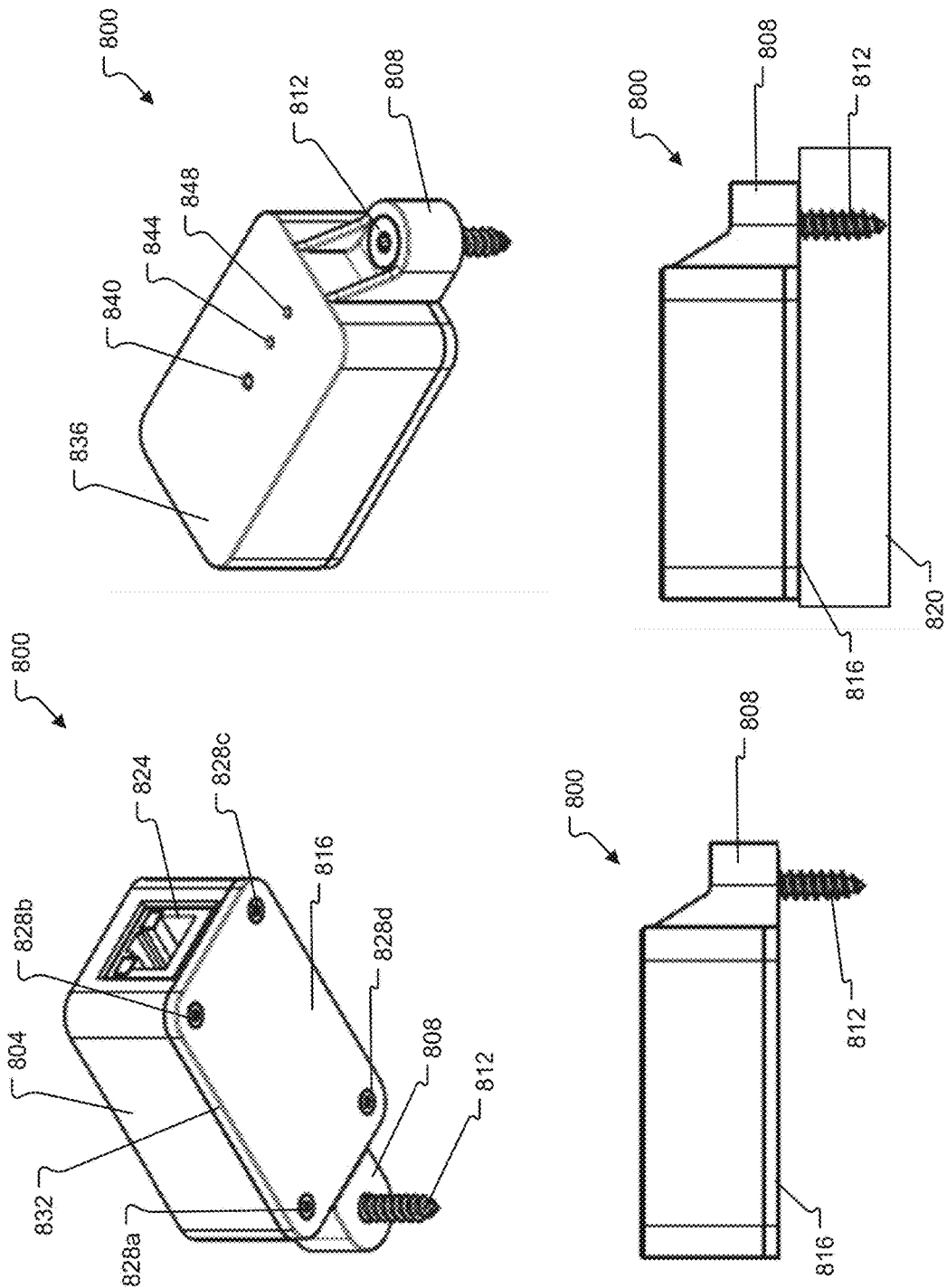
FIG. 8 illustrates various views of a sensor package according to at least one example embodiment.

FIG. 8 illustrates various views of a sensor package 800 according to at least one example embodiment. In general, a sensor package 800 comprises an injection-molded housing (made of some thermoplastic such as ABS) with a clamshell-style construction and appropriate fasteners to hold it together. A sensor package 800 further comprises a PCB assembly, which contains active circuitry, such as an Ethernet jack (RJ-45) for connection to a network and source of power (derived from PoE), a microcontroller, an accelerometer for sensing vibrations from hail or other impact events of interest, a combination temperature and humidity sensor (coupled to the attic environment with an appropriate port on the top of the housing), a microphone and appropriate conditioning circuitry (since hail impacts will produce considerable noise, acoustic sensing may be a valuable secondary metric of hail intensity and frequency), and an LED, useful for status information during commissioning and maintenance. The sensor package also includes an anchor mechanism which allows a standard fastener to attach the device to the underside of a roofs wood underlayment (e.g., 0.75" thick plywood).

In accordance with at least one embodiment, each sensor node 112 has all or some of its components contained in a sensor package 800. Stated another way, each sensor node 112 in FIGS. 1-7 may correspond to a single sensor package 800.

As shown in FIG. 8, a sensor package 800 includes a housing 804 that houses one or more of the components of a sensor node 112 in FIG. 2. For example, the sensors, power supply, processor, and/or memory of each sensor node 112 in FIG. 2 may be laid out on a PCB (not shown) mounted in the sensor package 800. One end of the housing 804 comprises a connection portion 808 that projects from the end of the housing 804 and that includes an opening for a connection mechanism 812 embodied in FIG. 8. A bottom surface 816 of the housing 804 may be planar across the entire bottom surface 816 (including a bottom surface of the connection portion 808) so that the bottom surface 816 is flush with a surface of a mounting member 820 when mounted to the mounting member 820. In one embodiment, the mounting member 820 corresponds to a joist, a beam, or a deck layer of a roof of a local structure 104. As shown in FIG. 8, the screw 812 is screwed into the mounting member 820 to secure the sensor package in place. A sensor package 800 is mounted to a part of the local structure 104 that enables the impact sensor 212 to sense impacts to an impact receiving surface of a structure envelop of the local structure 104 and/or other vibrations induced on the structure envelope of the local structure 104. Stated another way, a sensor package 800, which corresponds to a sensor node 112, is in force-transmitting contact with an impact receiving surface of a structure envelope of the local structure 104 to sense impacts to the impact receiving surface and/or other vibrations induced on the structure envelope of the local structure 104. The impact receiving surface may correspond to a surface of an outermost layer of the structure envelope, such as the exterior surface of singles or exterior surface of another layer of roofing material.

Another end of the housing 804 includes an interface 824 incorporated into the end of the housing 804, which is illustrated as an RJ-45 connector for Ethernet cables (e.g., Cat 6 and Cat 5 cables). However, example embodiments are not limited thereto, and the interface 824 may comprise any suitable interface for enabling communication and/or power transfer (e.g., a USB cable). In addition, a sensor package 800 may comprise multiple interfaces 824 to accommodate multiple means of communication and/or power transfer. In at least one embodiment, the interface 824 is omitted or remains unused, for example, when a sensor node 112 communicates wirelessly and operates on battery power.

The bottom surface 816 of the housing 804 may include connectors 828a to 828d, embodied as screws or rivets that secure a face plate 832 of the housing 804 to a main body of the housing 804 (the face plate 832 and the main body of the housing 804 form a clamshell-style piece). In one embodiment, the components of a sensor node 212 are mounted on a PCB which is in turn mounted to the face plate 832.

A top surface 836 of the housing 804 includes windows or ports 840 and 844 and an indicator 848. In one embodiment, port 840 provides a path for sound outside of the housing 840 to reach the microphone 208. Similarly, port 844 provides a window for the air sensor 216 and/or a humidity sensor 208. Indicator 848 may comprise one or more LEDs (light emitting diodes) that is used for communicating status information about the sensor node 112.

As may be appreciated, FIG. 8 illustrates one example of a sensor package 800 and that variations of the sensor package 800 are within the scope of inventive concepts. For example, the sensor package may include more or fewer of certain elements, such as more or fewer fasteners, more or fewer ports and/or indicators, and/or more or fewer interfaces.

Figure 9:
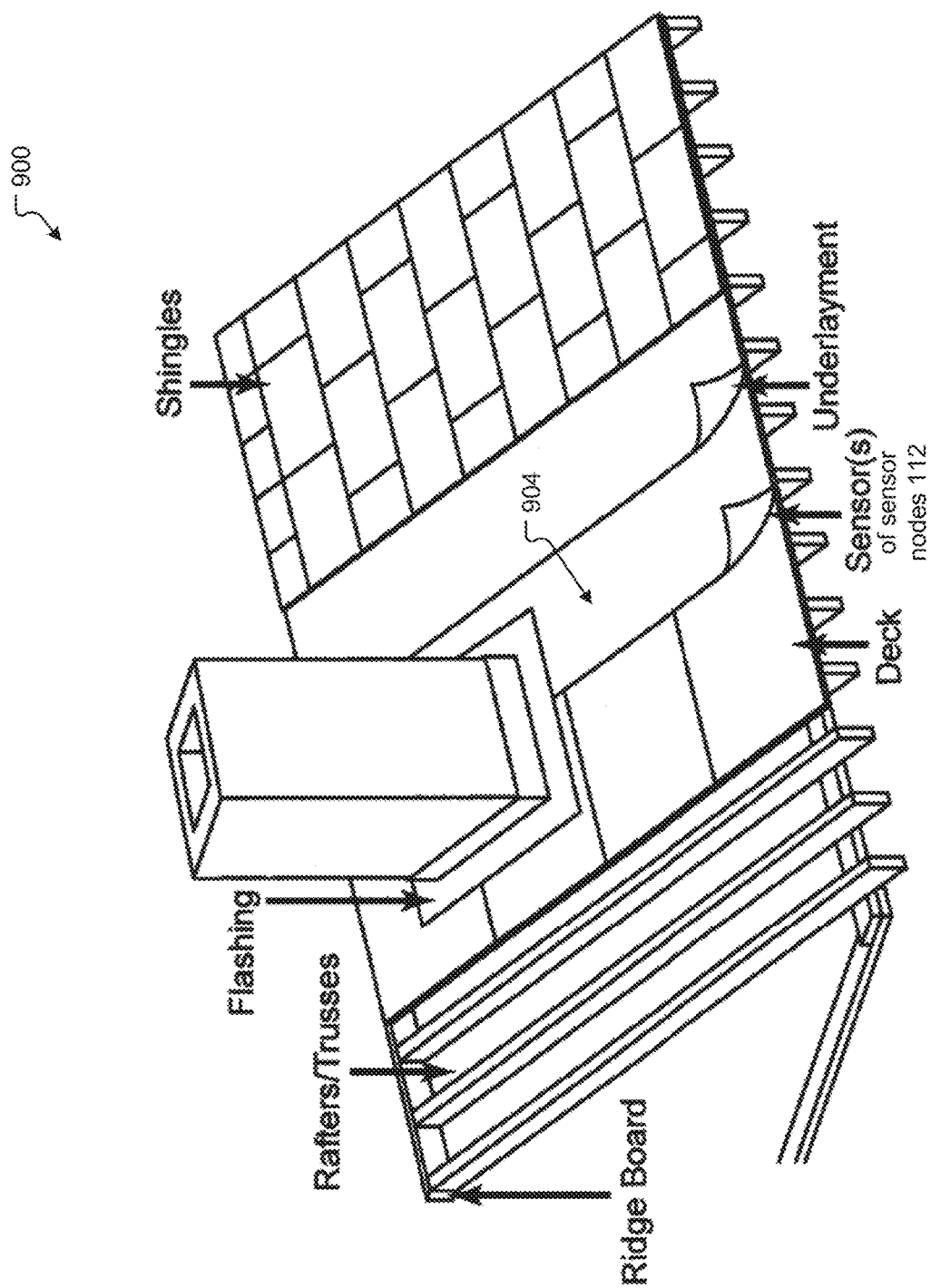
FIG. 9 illustrates a system with sensor(s) being incorporated into or between typical layers of roof according to at least one example embodiment.

FIG. 9 illustrates a system 900 with sensor(s) being incorporated into or between typical layers of roof according to at least one example embodiment. The sensor(s) may be the same of similar sensors as in the sensor nodes 112. As shown, the sensors in FIG. 9 may be part of a sensor layer 904 having a network of sensors provided between a deck layer and an underlayment layer of a roof. Additionally or alternatively, the sensor layer 904 may be integrated with any other layer on the roof, for example, integrated with the underlayment layer and/or integrated with the shingles or other outermost covering. In any event, sensors of the sensor layer 904 are in force-transmitting contact with an impact surface of the roof, which corresponds to the layer of shingles in FIG. 9.

In accordance with example embodiments, the sensors of the sensor layer 904 may comprise, among other sensors, impact sensors may comprise any known type of electrical, mechanical, and/or electromechanical sensor that detects impact, vibration, or mechanical shock, for example, piezoelectric sensors, piezoresistive sensors, accelerometers, capacitive sensors, strain-gauge sensors, optical sensors, pressure sensors, force-sensitive resistors, etc.

A network of impact sensors may be distributed at desired intervals and/or in a desired pattern (e.g., in a matrix) throughout the sensor layer 904 or in certain portions of the sensor layer according to design preferences. The network of impact sensors may include sub-sections of impact sensors that are independent from other sections of impact sensors to provide more localized impact detection and reporting for the structure. The network of impact sensors may convert detected impacts into electrical signals that are reported to and/or stored at a local and/or remote processing device (or processor) via any known wired and/or wireless communication method. The network of impact sensors may include more or fewer sensor areas of the structure depending on a level of sensitivity desired for the areas of the structure. For example, areas of the structure that are more vulnerable to impacts (e.g., areas under trees or other hazards) may include a higher density of impact sensors compared to areas of the structure that are less vulnerable to impacts.

The sensor layer 904 may include separate non-contiguous portions that are installed at certain locations on the structure envelope in the same or similar manner as shown in FIG. 7.

The sensor layer 904 may be substituted for the sensor nodes 112 in the previous figures and/or may supplement the sensor nodes 112. Thus, the system 900 may include the same or similar elements and operate in the same or similar manner as that described above with reference to FIGS. 1-8.

Figure 10:
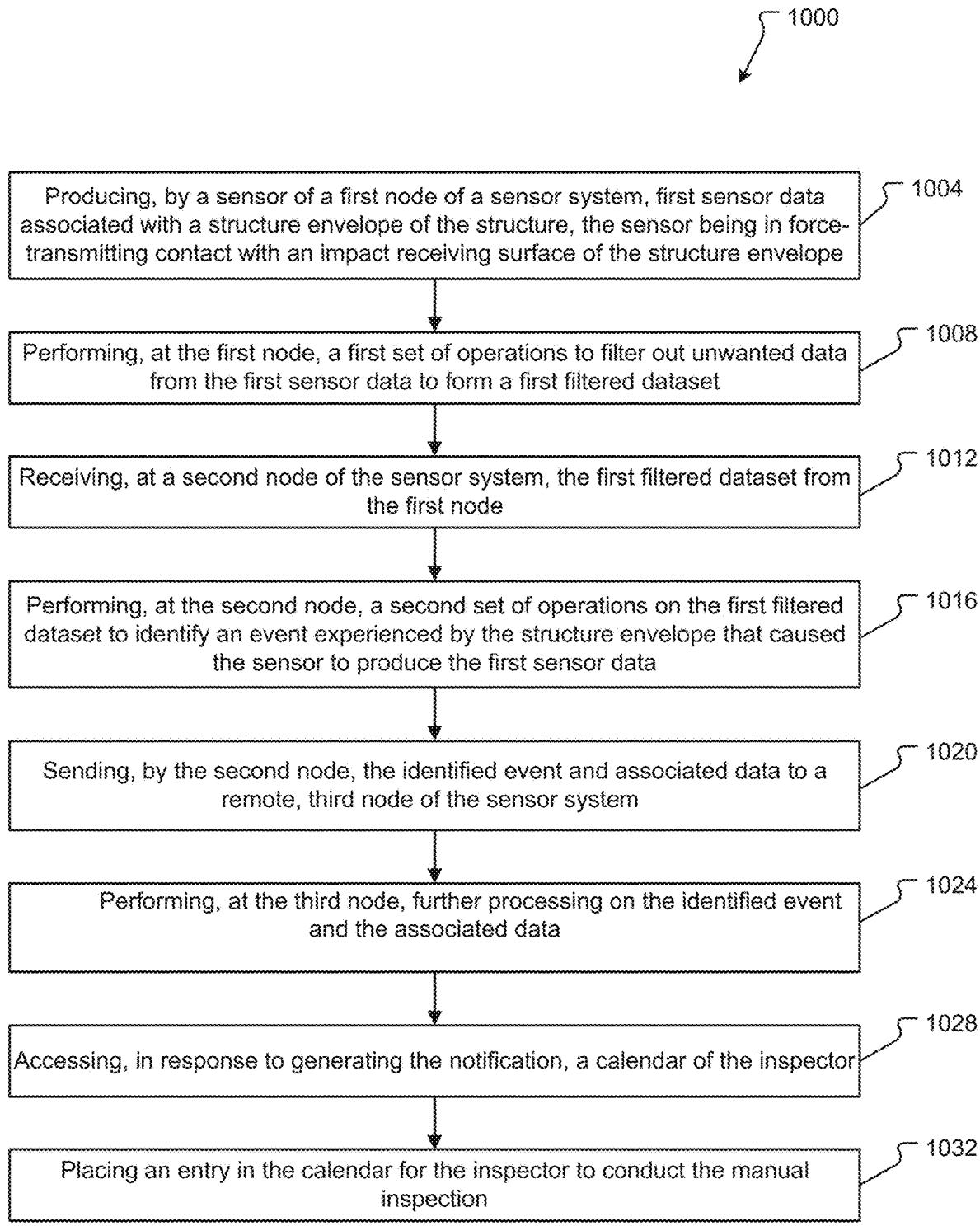
FIG. 10 illustrates a method for a sensor system according to at least one example embodiment.

FIG. 10 illustrates a method 1000 for a sensor system according to at least one example embodiment. More specifically, the method 1000 may be performed for a sensor system 118 that processes sensor data in a tiered fashion to reduce power consumption and unnecessary network traffic while improving the accuracy and efficiency of backend processes for an interested entity (e.g., an insurance company, property owner, etc.). The method 1000 may be performed by one or more of the elements described above with reference to FIG. 9.

Operation 1004 includes producing, by a sensor of a first node of a sensor system, first sensor data associated with a structure envelope of the structure. The sensor may correspond to one of the sensors in FIG. 2 (e.g., an impact sensor 212) and be in force-transmitting contact with an impact receiving surface of the structure envelope. The structure may correspond to local structure 104 while the structure envelope may correspond to a roof or other part of the local structure 104 that has an impact surface receiving surface exposed to the outside environment. The sensor system may correspond to sensor system 118 with the first node corresponding to a sensor node 112. The first sensor data is data or sensor signals output from the sensor to, for example, the processor 232. As may be appreciated, other suitable sensors from FIG. 2 may be included in the first node 112. In this case, the first sensor data may include data from all or selected sensors in the first node 112.

Operation 1008 includes performing, at the first node 112, a first set of operations to filter out unwanted data from the first sensor data to form a first filtered dataset. In one embodiment, and as noted in the description of FIG. 2, the first set of operations includes comparing the first sensor data to one or more thresholds, and identifying data in the first sensor data as unwanted data or as data of the first filtered dataset based on the comparison. For example, the first sensor data may be comprised of sensor signals (e.g., raw sensor signals or lightly processed sensor signals). In this case, one or more signal characteristics (e.g., frequency, amplitude, phase, SNR, and/or the like) of the sensor signals are compared against one or more corresponding thresholds for the one or more signal characteristics to filter out unwanted data from the first sensor data. Consider an example where the sensor corresponds to an impact sensor 212, and the first sensor data comprises electronic sensor signals having amplitudes that vary based on an amount of force detected by the impact sensor 212, then the first set of operations may include comparing the amplitudes of the sensor signals against a threshold amplitude, and identifying unwanted data as those sensor signals having amplitudes that do not exceed the threshold amplitude. Here, the first filtered dataset would then include only sensor signals that exceed the threshold, thereby reducing the amount of sensor data that is output from the first node 112 to, for example, a second node of the sensor system 118 such as the sensor hub 116 for another round of processing to identify an event. In one embodiment, the unwanted data corresponds to data that is not relevant to identifying an event (e.g., a hailstorm), and the first filtered dataset corresponds to data that is relevant to identifying an event.

The first set of operations in step 1008 may further include other data conditioning processes. For example, the first set of operations may include reducing signal noise from sensor signals and/or deriving indications of central tendency with techniques like averaging (simple, boxcar) or median filtering. More sophisticated filter types might also prove useful at this initial stage—given that each node contains a bevy of sensors, operation 1008 (or a later operation) may include performing sensor fusion algorithms like Kalman filtering or associated variants to determine candidate events. A first node or sensor node 112 may forward candidate events to the sensor hub 116 to be processed with or compared to other candidate events from other sensor nodes 112. Candidate events are events that are not necessarily directly observable by a sensor node 112 (e.g., fire), but that are determined to exist when sensor data from multiple sensors of a sensor node 112 are correlated. In this case, the sensor hub 116 may serve to increase the confidence level of a candidate event from one sensor node 112 based on candidate events received from other sensor nodes 112.

As described with reference to FIG. 2, the method 1000 may include at least one operation that triggers collection of sensor data by the first node 112 and/or by other first nodes 112 in the sensor system 118 by switching the nodes 112 from an off-state or sleep state to an active state for collecting sensor data.

Having the first node 112 perform the above-described operations of the method 1000 corresponds to a first tier of processing that may improve performance and/or efficiency of the sensor system 118.

Operation 1012 includes receiving, at a second node of the sensor system 118, the first filtered dataset from the first node. The second node may correspond to the sensor hub 116. However, in the event that the sensor hub 116 is omitted or bypassed, the second node may correspond to the remote system 108. The second node 116 receives the first filtered dataset over a suitable wired and/or wireless connection as described with reference to FIGS. 3-6.

Operation 1016 includes performing, at the second node 116, a second set of operations on the first filtered dataset to identify an event experienced by the structure envelope that caused the sensor to produce the first sensor data. As described above with reference to Table 1 and FIGS. 1-8, the second set of operations includes consulting reference data that associates events with rules (or rule sets) that should be satisfied for each event. The event is identified from the reference data when the first filtered dataset satisfies at least one rule for the event. Additionally or alternatively, the event is identified based on references values and/or ranges of reference values in the reference data. For example, the sensor data from sensors of the first node or multiple first nodes (sensor nodes 112) may indicate that the sensed parameters (e.g., impact, temperature, etc.) fall within ranges associated with a particular event which is considered as the identified event.

In at least one embodiment where the sensor system 118 includes multiple first nodes 112, operations 1012 and/or 1016 include receiving, at the second node 116 of the sensor system 118, a second filtered dataset from an additional first node 112 of the sensor system 118. The additional first node 112 may also be in force-transmitting contact with the impact receiving surface of the structure envelope. In this case, the second set of operations includes identifying the event based on the first filtered dataset and the second filtered dataset. Identifying the event based on the first filtered dataset and the second filtered dataset may include consulting the reference data in the same or similar manner as that described above to evaluate the filter and second filtered datasets against one or more rules, one or more reference values, or one or reference value ranges. An event is identified from the reference data when the first and second filtered datasets satisfy at least one rule associated with the identified the event.

As may be appreciated, the second filtered dataset is produced in the same or similar manner as that described for the first filtered dataset. For example, the method 1000 includes steps that occur in parallel with operations 1004 and/or 1008 where the additional first node 112 of the sensor system 118 produces second sensor data associated with the structure envelope, and then filters out unwanted data in the second sensor data to form the second filtered dataset in the same or similar manner as filtered to arrive at the first filtered dataset. In at least one example embodiment, the first sensor data and the second sensor data are indicative of the same sensed parameters (e.g., impacts, temperature, etc.). Similarly, the first and second filtered datasets are indicative of the same sensed parameters (e.g., impacts, temperature, etc.), but are reduced datasets compared to the first and second sensor data.

In one embodiment, operation 1016 includes the second node 116 focusing on inputs from multiple sensor nodes 112 for the purpose of increasing the confidence in identifying events for reporting to the remote system 108 and/or increasing the confidence in generating alerts that may request or require some level of human action. If, for instance, despite appropriate initial stage filtering at a first node 112, the first node 112 reports impacts to the second node 116 that the first node 112 identifies as hail but no other first nodes 112 in the structure 104 have corroborating reports, then the second node 116 may conclude that the first node 112 reporting hail impacts has a sensor malfunction since hail impacts are typically distributed across a roof and do not occur in one area. If such an anomalous event occurs more than a threshold number of times, then the second node 116 may also generate a system maintenance alert that would prompt a service technician to check or replace the sensor that has been producing untrustworthy data.

Operation 1020 includes sending, by the second node 116, the identified event and associated data to a remote, third node of the sensor system 118 such as the remote system 108 through a suitable wired and/or wireless connection (see FIGS. 3-6, for example). Although not explicitly shown, the second set operations and/or operation 1020 may include steps to identify the associated data to send along with the identified event to the third node 108. For example, certain subsets of data within the first and/or second filtered datasets received at the second node may be useful for sending along with the identified event for further processing at the third node 108 while other subsets of data within the first and/or second filtered datasets are not useful for further processing. Thus, the data in the first and/or second filtered datasets that is not useful at the third node may be filtered out and discarded by the second node 116 (i.e., not sent to the third node 108). The third node 108 may provide the second node 116 with instructions and/or information on which associated data to send with the identified event and which sensor data to discard.

The associated data may comprise other information not associated with the filtered datasets received from first nodes 112 by the second node 116. For example, the associated data may include information about the structure (e.g., structure age, roof age and type of materials used, structure size (total area), roof size (e.g., total area occupied by shingles), the structure's street address, owner contact information and/or any other information that may be considered useful for the further processing at the third node. The associated data may include information to identify other types of property owned by the property owner that are also insured by the insurance provider (e.g., vehicles). Such information may be useful since detection of an event like a hailstorm may also cause damage to the other types of property at the same address. Inclusion of this information in the associated data may prompt the property owner and/or the insurance provider to make recommendations about the condition or claim status of the other property types. In one embodiment, the third node 108 has access to a storage device that pre-stores such information or other information associated with the structure and/or identified events so that the second node 116 can include pointers to the stored information stored at the third node 108 instead of the information itself.

As may be appreciated, having the second node 116 identify the event and determine which sensor data to send with the identified event to the third node 108 corresponds to a second tier of processing that may improve performance and/or efficiency of the sensor system 118. The second tier of processing may be more complex than the first tier of processing carried out by first nodes 112.

Operation 1024 includes performing, at the third node 108, further processing on the identified event and the associated data. The further processing includes operations that an interested entity (homeowner, insurance company, etc.) finds useful for assessing a condition of the structure, for drawing conclusions about the condition of the structure, and/or for making recommendations to the interested entity (e.g., seek repair, schedule inspections, take no action, etc.). In one embodiment, performing the further processing includes determining a condition of the structure based on the identified event and the associated data, and then generating a notification to notify an interested entity of the condition of the structure. Here, the notification may comprise a recommendation have an inspector conduct a manual inspection of the structure. The recommendation may be made to one or more interested entities, such as the property owner and the home insurance provider. As noted above, the further processing may include using the identified event and associated data as training data for a machine learning algorithm and/or a neural network design to improve detection of events and responses of interested parties to detected events.

In one non-limiting example, the further processing includes the third node 108 identifying an event, for example, if the second node 116 passes sensor data and/or other data to the third node 108 without an identified event or with a partially identified event. Identifying an event at the third node 108 may occur to confirm the event identified at the second node or when the second node 116 is unable to identify the event as a result of a lack of reference data or the lack of processing capability. In the scenario where the second node 116 is unable to identify an event as a result of being unable to match filtered data sets to corresponding reference data that belongs to an event, the third node 108 may have a more complete set of reference data as a result of having immediate access to information from multiple structures 104. Indeed, the remote system 108 serves many structures 104 and analyzes data received from these structures to, among other things, hone event identification and/or to create new events.

For example, one or more sensor nodes 112 may detect abnormal air particulate levels as a result of smoke in an attic where the sensor nodes 112 are mounted, but the second node 116 cannot identify a particular event. In this case, the data regarding detected particulate levels may be passed to the third node 108 where the third node 108 is able to identify a "smoke detected" event using a more complete set of reference data gleaned from data received from other structures 104. The second node 116 may not be able to identify an event for multiple reasons including but not limited to the second node 116 not having the capability (e.g., due to a malfunction or due to design), the second node 116 not having an updated set of reference data that accounts for particulate levels, the detected particulate levels not being sufficient for the second node 116 identify the event with the current set of reference data that does account for particular levels, and/or the like.

Operation 1028 includes accessing, in response to generating the notification, a calendar of the inspector while operation 1032 includes placing an entry in the calendar for the inspector to conduct the manual inspection and/or notifying the property owner of the time and date of inspection. Operations 1028 and 1032 may occur automatically at the third node 108 without or with little human intervention so that burden on the property owner and/or the insurance provider is reduced after the occurrence of an event, which may further improve the efficiency handling insurance claims related to the event. Operations 1028 and 1032 may be optional operations for the method 1000. Other post-processing type operations may be carried out as part of the method 1000 depending on the scenario. For example, the third node 108 may associate detected movement of the structure 104 as exceeding a threshold amount and identify an earthquake event, which may prompt inspection scheduling, or a recommendation to condemn the structure 104 if the movement exceeds a larger threshold amount. In yet another example, the temperature across the sensor nodes 112 may vary by more than a threshold amount, which can trigger a recommendation to inspect the insulation in locations where the temperature variation is over the threshold amount.

The method 1000 has been described with reference to two sensor nodes 112 (e.g., the first node and the additional first node) that provide filtered datasets to a second node such as the sensor hub 116. However, additional filtered datasets may be received by the second node 116 from as many sensor nodes 112 that are at the structure 104 so that the method 1000 takes all of this data into account.

In view of the above, it should be appreciated that at least one example embodiment is directed to a sensor system 118 for a structure 104. The sensor system 118 may comprise a sensor node 112 in force transmitting contact with an impact receiving surface of a structure envelope of the structure 104. The sensor node 112 is configured to generate first sensor data associated with the structure envelope of the structure, and perform a first set of operations to filter out unwanted data from the first sensor data to form a first filtered dataset. The sensor system 118 may further comprise a sensor hub 116 in communication with the sensor node 112. The sensor hub 116 is configured to receive the first filtered dataset from the sensor node, and perform a second set of operations on the first filtered dataset to identify an event experienced by the structure envelope that caused the sensor node to produce the first sensor data. The sensor system 118 may further include or be in communication with a remote system 108. The sensor hub 116 may send the identified event and associated data to the remote system. Here, the remote system 108 is configured to perform further processing on the identified event and the associated data.

In view of the instant description, example embodiments propose to solve technical problems that plague property owners and/or the property insurance industry. Such technical problems include inefficiencies related to damage assessment, delayed reporting of incidents, fraudulent reporting of incidents, and/or unnecessary reporting of incidents. Additional technical problems include inefficiencies in determining the condition of a structure after an event for the purposes of scheduling an inspection, estimating likely repairs and associated costs, and/or the like. Another technical problem arises in that an interested entity may be overloaded with sensor data related to the occurrence of an event. Example embodiments propose to solve these and other technical problems not explicitly stated herein with a sensor system that provides multiple tiers of processing to filter out unwanted sensor data prior to additional (sometimes more involved) processing steps that occur at a remote system located offsite from the structure while providing timely and accurate event detection and associated information to interested parties. The sensor nodes perform a first tier of processing to filter sensor data passed to the sensor hub, the sensor hub performs a second tier of processing to filter data passed to the remote system, and the remote system performs backend processing with a wholistic view of data from multiple structures. Each tier of processing may increase in complexity (from the sensor nodes, to the sensor hub, to the remote system) so that the sensor system provides a cost-effective and accurate way to handle the interaction between property owners and insurance providers.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment. Embodiments may be configured as follows:

(1) A sensor system for a structure, the sensor system comprising:
   a sensor node in force transmitting contact with an impact receiving surface of a structure envelope of the structure, the sensor node being configured to:
      generate first sensor data associated with the structure envelope of the structure; and
      perform a first set of operations to filter out unwanted data from the first sensor data to form a first filtered dataset;
   a sensor hub in communication with the sensor node, the sensor hub being configured to:
      receive the first filtered dataset from the sensor node; and
      perform a second set of operations on the first filtered dataset to identify an event experienced by the structure envelope that caused the sensor node to produce the first sensor data.

(2) The sensor system of (1), further comprising:
   an additional sensor node in force transmitting contact with the impact receiving surface of the structure envelope, wherein the sensor hub is configured to:
      receive a second filtered dataset from the additional sensor node, wherein the second set of operations includes:
         identifying the event based on the first filtered dataset and the second filtered dataset.

(3) The sensor system of one or more of (1) to (2), wherein identifying the event based on the first filtered dataset and the second filtered dataset includes:
   consulting reference data that associates events with reference values for the first and second filtered datasets.

(4) The sensor system of one or more of (1) to (3), wherein identifying the event based on the first filtered dataset and the second filtered dataset includes:
   consulting reference data that associates events with rules that should be satisfied for each event.

(5) The sensor system of one or more of (1) to (4), wherein the event is identified from the reference data when the first and second filtered datasets satisfy at least one rule for the event.

(6) The sensor system of one or more of (1) to (5), wherein the additional sensor node is configured to:
   produce second sensor data associated with the structure envelope; and
   filter out unwanted data in the second sensor data to form the second filtered dataset.

(7) The sensor system of one or more of (1) to (6), wherein the first set of operations includes:
   comparing the first sensor data to one or more thresholds; and
   identifying data in the first sensor data as unwanted data or as data of the first filtered dataset based on the comparison.

(8) The sensor system of one or more of (1) to (7), wherein the unwanted data corresponds to data that is not relevant to identifying an event, and wherein the first filtered dataset corresponds to data that is relevant to identifying an event.

(9) The sensor system of one or more of (1) to (8), wherein the second set of operations includes:
   consulting reference data that associates events with rules that should be satisfied for each event, wherein the event is identified from the reference data when the first filtered dataset satisfies at least one rule for the event.

(10) The sensor system of one or more of (1) to (9), further comprising:
   a remote system, wherein the sensor hub is configured to:
      send the identified event and associated data to the remote system, wherein the remote system is configured to perform further processing on the identified event and the associated data.

(11) The sensor system of one or more of (1) to (10), wherein the further processing includes:
   determining a condition of the structure based on the identified event and the associated data; and
   generating a notification to notify an interested entity of the condition of the structure.

(12) The sensor system of one or more of (1) to (11), wherein the notification comprises a recommendation have an inspector conduct a manual inspection of the structure.

(13) The sensor system of one or more of (1) to (12), wherein the remote system is configured to:
   access, in response to generating the notification, a calendar of the inspector; and
   place an entry in the calendar for the inspector to conduct the manual inspection.

(14) The sensor system of one or more of (1) to (13), wherein the sensor comprises an impact sensor so that the first sensor data is indicative of impacts to the impact receiving surface of the structure envelope.

(15) An impact detection method for a structure, the method comprising:
   producing, by an impact sensor of a first node of a sensor system, first sensor data associated with a structure envelope of the structure, the impact sensor being in force-transmitting contact with an impact receiving surface of the structure envelope to detect impacts to the impact receiving surface;

performing, at the first node, a first set of operations to filter out unwanted data from the first sensor data to form a first filtered dataset;

receiving, at a second node of the sensor system, the first filtered dataset from the first node; and performing, at the second node, a second set of operations on the first filtered dataset to identify an event experienced by the structure envelope that caused the sensor to produce the first sensor data.

(16) The method of (15), further comprising:

receiving, at the second node of the sensor system, a second filtered dataset from an additional first node of the sensor system, wherein the second set of operations includes:

identifying the event based on the first filtered dataset and the second filtered dataset.

(17) The method of one or more of (15) to (16), wherein identifying the event based on the first filtered dataset and the second filtered dataset includes:

consulting reference data that associates events with rules that should be satisfied for each event.

(18) The method of one or more of (15) to (17), further comprising:

sending, by the second node, the identified event and associated data to a remote, third node of the sensor system;

performing, at the third node, further processing on the identified event and the sensor data.

(19) The method of one or more of (15) to (18), wherein the further processing includes:

determining a condition of the structure based on the identified event and the associated data; and generating a notification to notify an entity of the condition of the structure, the entity being associated with the third node of the sensor system.

(20) A sensor system, comprising:

a first node in force transmitting contact with an impact receiving surface of a structure envelope of the structure, the first node being configured to:

generate first sensor data associated with the structure envelope of the structure;

perform a first set of operations to filter out unwanted data from the first sensor data to form a first filtered dataset;

a second node in communication with the first node, the second node being configured to:

receive the first filtered dataset from the first node; and perform a second set of operations on the first filtered dataset to identify an event experienced by the structure envelope that caused the first node to produce the first sensor data.

What is claimed is:

1. A sensor system for a structure, the sensor system comprising:

a sensor node including a plurality of sensors housed in a single housing, the plurality of sensors including:

at least one sensor that senses one or more aspects of an environment within or surrounding the sensor node; and a first impact sensor in force transmitting contact with an impact receiving surface of a roof of the structure, the sensor node being configured to:

generate, from the plurality of sensors, first sensor data associated with the roof of the structure; and perform a first set of operations to filter out unwanted data from the first sensor data to form a first filtered dataset including sensor data from the first impact sensor and the at least one sensor;

a sensor hub in communication with the sensor node, the sensor hub being configured to:

receive the first filtered dataset from the sensor node; and perform a second set of operations on the first filtered dataset to identify an event experienced by the roof that caused the sensor node to produce the first sensor data; and a remote system located remotely from the sensor hub, wherein the sensor hub is configured to send the identified event and associated data to the remote system, wherein the remote system is configured to perform further processing on the identified event and the associated data, wherein the associated data includes a timestamp of when the identified event occurred, and wherein the further processing by the remote system includes:

determining a time window that encompasses the timestamp, a length of the time window being determined based on first information indicating how long the identified event lasted;

identifying an area of interest based on second information indicating a location of the identified event, the area of interest including one or more other structures that experienced the identified event;

analyzing other data collected during the time window by sensor nodes of the one or more other structures in the area of interest; and confirming or disconfirming the occurrence of the identified event as identified by the sensor hub based on the analysis of the other data.

2. The sensor system of claim 1, further comprising:

an additional sensor node in force transmitting contact with the impact receiving surface of the roof, wherein the sensor hub is configured to:

receive a second filtered dataset from the additional sensor node, wherein the second set of operations includes:

identifying the event based on the first filtered dataset and the second filtered dataset, wherein the unwanted data filtered out from the first sensor data includes unwanted sensor data from the first impact sensor and unwanted sensor data from the at least one sensor that senses one or more aspects of the environment, and wherein the plurality of sensors further comprises a temperature sensor, an acoustic sensor, and a humidity sensor.

3. The sensor system of claim 2, wherein identifying the event based on the first filtered dataset and the second filtered dataset includes:

consulting reference data that associates events with reference values for the first and second filtered datasets.

4. The sensor system of claim 2, wherein identifying the event based on the first filtered dataset and the second filtered dataset includes:

consulting reference data that associates events with rules that should be satisfied for each identified event.

5. The sensor system of claim 4, wherein the identified event is identified from the reference data when the first and second filtered datasets satisfy at least one of the rules.

6. The sensor system of claim 2, wherein the additional sensor node includes a second impact sensor and at least one sensor that senses one or more aspects of an environment within or surrounding the additional sensor node, and wherein the additional sensor node is configured to:

produce second sensor data from the second impact sensor and the at least one sensor of the additional sensor node; and filter out unwanted data in the second sensor data to form the second filtered dataset.

7. The sensor system of claim 1, wherein the first information and the second information are retrieved from a source external to the sensor node and the sensor hub, wherein output of one of the plurality of sensors wakes up the sensor node from a low power state to cause the sensor node to initiate the first set of operations, and wherein the first set of operations includes:

comparing the first sensor data to one or more thresholds; and identifying data in the first sensor data as the unwanted data or as data of the first filtered dataset based on the comparison.

8. The sensor system of claim 7, wherein the housing comprises a flat surface that mounts to an underside of the roof, wherein the unwanted data corresponds to data that is not relevant to identifying an event, and wherein the first filtered dataset corresponds to data that is relevant to identifying an event.

9. The sensor system of claim 1, wherein the second set of operations includes:

consulting a table that includes a list of possible events, wherein, for each possible event, the table lists a subset of sensors in the plurality of sensors and a range of values for each parameter sensed by the subset of sensors, wherein the sensor hub selects a possible event from the list as the identified event when all parameters sensed by the subset of sensors for the selected possible event fall within corresponding ranges of values, and wherein the subset of sensors differs for at least some of the possible events.

10. The sensor system of claim 1, wherein the sensor node identifies a candidate event using the first filtered dataset and sends the candidate event to the sensor hub, wherein the candidate event is not directly observable from individual outputs of the plurality of sensors, and wherein the sensor hub adjusts a confidence level of the candidate event based on at least one additional candidate event received by the sensor hub from an additional sensor node.

11. The sensor system of claim 1, wherein the further processing includes:

determining a condition of the structure based on the identified event and the associated data; and generating a notification to notify an interested entity of the condition of the structure.

12. The sensor system of claim 11, wherein the notification comprises a recommendation have an inspector conduct a manual inspection of the structure.

13. The sensor system of claim 12, wherein the remote system is configured to:

access, in response to generating the notification, a calendar of the inspector; and place an entry in the calendar for the inspector to conduct the manual inspection.

14. The sensor system of claim 1, further comprising:

a sensor calibrator included in the sensor node or the sensor hub and that outputs vibrations detectable by the first impact sensor to calibrate the first impact sensor or to perform a functional check of the first impact sensor.

15. An impact detection method for a structure, the method comprising:

producing, by an impact sensor and at least one sensor of a first node of a sensor system, first sensor data associated with a roof of the structure, the impact sensor being in force-transmitting contact with an impact receiving surface of the roof to detect impacts to the impact receiving surface, wherein the at least one sensor senses one or more aspects of an environment within or surrounding the first node, and wherein the impact sensor and the at least one sensor are included with a plurality of sensors housed in a same housing;

performing, at the first node, a first set of operations to filter out unwanted data from the first sensor data to form a first filtered dataset including sensor data from the impact sensor and the at least one sensor;

receiving, at a second node of the sensor system, the first filtered dataset from the first node; and performing, at the second node, a second set of operations on the first filtered dataset to identify an event experienced by the roof that caused the impact sensor and the at least one sensor to produce the first sensor data, wherein the second set of operations includes consulting a table that includes a list of possible events, wherein, for each possible event, the table lists a subset of sensors in the plurality of sensors and a range of values for each parameter sensed by the subset of sensors, wherein the second node selects a possible event from the list as the identified event when all parameters sensed by the subset of sensors for the selected possible event fall within corresponding ranges of values, and wherein the subset of sensors differs for at least some of the possible events.

16. The method of claim 15, further comprising:

receiving, at the second node of the sensor system, a second filtered dataset from an additional first node of the sensor system, wherein the second set of operations includes:

identifying the event based on the first filtered dataset and the second filtered dataset.

17. The method of claim 16, wherein identifying the event based on the first filtered dataset and the second filtered dataset includes:

consulting reference data that associates events with rules that should be satisfied for each event.

18. The method of claim 16, further comprising:

sending, by the second node, the identified event and associated data to a remote, third node of the sensor system; and performing, at the third node, further processing on the identified event and the associated data, wherein the associated data includes a timestamp of when the identified event occurred, and wherein the further processing includes:

determining a time window that encompasses the timestamp, a length of the time window being determined based on first information indicating how long the identified event lasted;

identifying an area of interest based on second information indicating a location of the identified event, the area of interest including one or more other structures that experienced the identified event, analyzing other data collected during the time window by sensor nodes of the one or more other structures in the area of interest; and confirming or disconfirming the occurrence of the identified event as identified by the second node based on the analysis of the other data.

19. The method of claim 18, wherein the further processing includes:
- determining a condition of the structure based on the identified event and the associated data; and
- generating a notification to notify an entity of the condition of the structure, the entity being associated with the third node of the sensor system.

20. A sensor system, comprising:
- a first node in force transmitting contact with an impact receiving surface of a roof of a structure, the first node including a plurality of sensors, the plurality of sensors including an impact sensor and at least one sensor housed in a single housing, the at least one sensor sensing one or more aspects of an environment within or surrounding the first node, the first node being configured to:
  - generate, from the plurality of sensors, first sensor data associated with the roof of the structure; and
  - correlate the first sensor data to identify a first candidate event that caused the plurality of sensors to generate the first sensor data, wherein the first candidate event is not directly identifiable from individual outputs of the plurality of sensors; and
- a second node in communication with the first node, the second node being configured to:
  - receive the first candidate event from the first node;
  - receive second candidate events from other first nodes of the sensor system, wherein the second candidate events are not directly identifiable from individual outputs of sensors of the other first nodes; and
  - adjust a confidence level of the first candidate event based on the second candidate events.

* * * * *